(12) United States Patent
Ferguson et al.

(10) Patent No.: US 10,331,124 B2
(45) Date of Patent: Jun. 25, 2019

(54) AUTONOMOUS VEHICLE REPOSITIONING

(71) Applicant: Nuro, Inc., Mountain View, CA (US)

(72) Inventors: David Ferguson, San Francisco, CA (US); Jiajun Zhu, Palo Alto, CA (US); Cosimo Leipold, Washington, DC (US); Pichayut Jirapinyo, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 16/040,446

(22) Filed: Jul. 19, 2018

(65) Prior Publication Data
US 2019/0025820 A1    Jan. 24, 2019

Related U.S. Application Data

(60) Provisional application No. 62/534,929, filed on Jul. 20, 2017.

(51) Int. Cl.
| | |
|---|---|
| G05D 1/00 | (2006.01) |
| G01C 21/34 | (2006.01) |
| G06Q 30/02 | (2012.01) |
| G06N 20/00 | (2019.01) |

(Continued)

(52) U.S. Cl.
CPC ....... *G05D 1/0027* (2013.01); *G01C 21/3438* (2013.01); *G05D 1/0088* (2013.01); *G06K 9/00798* (2013.01); *G06K 9/00818* (2013.01); *G06K 9/00825* (2013.01); *G06N 20/00* (2019.01); *G06Q 30/0205* (2013.01); *G06T 7/0004* (2013.01); *G05D 2201/0207* (2013.01); *G05D 2201/0213* (2013.01); *G06T 2207/10044* (2013.01); *G06T 2207/30184* (2013.01); *G06T 2207/30256* (2013.01)

(58) Field of Classification Search
USPC ..................................... 701/23–28
See application file for complete search history.

(56) References Cited

U.S. PATENT DOCUMENTS

| | | |
|---|---|---|
| 3,064,252 A | 11/1962 | Varela |
| 4,766,548 A | 8/1988 | Cedrone et al. |
| 4,952,911 A | 8/1990 | D'Ambrosia et al. |

(Continued)

FOREIGN PATENT DOCUMENTS

| | | |
|---|---|---|
| JP | H036407 A | 1/1991 |
| JP | 2001256576 A | 9/2001 |

(Continued)

OTHER PUBLICATIONS

PCT/US2018/042967 International Search Report and Written Opinion dated Sep. 26, 2018.

(Continued)

*Primary Examiner* — Jonathan L Sample
(74) *Attorney, Agent, or Firm* — Wilson Sonsini Goodrich & Rosati

(57) ABSTRACT

Provided herein is a platform for distributing and navigating an autonomous or semi-autonomous fleet throughout a plurality of pathways. The platform may employ demand distribution prediction algorithms, and interim repositioning algorithms to distribute the autonomous or semi-autonomous fleet for performing orders and tasks.

19 Claims, 13 Drawing Sheets

(51) Int. Cl.
*G06K 9/00* (2006.01)
*G06T 7/00* (2017.01)

(56) References Cited

U.S. PATENT DOCUMENTS

| | | | |
|---|---|---|---|
| 5,128,861 A | 7/1992 | Kagami et al. |
| 5,179,843 A | 1/1993 | Cohausz |
| 5,207,784 A | 5/1993 | Schwartzendruber et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Gleckler et al. |
| 7,281,891 B2 | 10/2007 | Smith et al. |
| 7,521,935 B2 | 4/2009 | Uchida et al. |
| 7,534,984 B2 | 5/2009 | Gleckler |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Pradaet al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1* | 3/2015 | Skaaksrud ............ H04W 12/06 370/255 |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2* | 1/2016 | Villamar ............ G06Q 10/087 |
| 9,256,852 B1* | 2/2016 | Myllymaki ......... G06Q 10/083 |
| 9,307,383 B1 | 4/2016 | Patrick |
| D755,673 S | 5/2016 | Ahn et al. |
| 9,383,753 B1 | 7/2016 | Templeton et al. |
| 9,488,984 B1* | 11/2016 | Williams ............ G05D 1/0274 |
| 9,489,490 B1 | 11/2016 | Theobald et al. |
| 9,552,564 B1* | 1/2017 | Martenis ............ G06Q 10/083 |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1* | 2/2018 | Kumar ................ G05D 1/0088 |
| 9,916,703 B2* | 3/2018 | Levinson ............ G01S 15/931 |
| 9,984,525 B2 | 5/2018 | Will et al. |
| 1,002,978 A1 | 7/2018 | Lesser et al. |
| 1,012,038 A1 | 11/2018 | Wilkinson et al. |
| 2002/0023594 A1 | 2/2002 | Greene et al. |
| 2003/0209375 A1 | 11/2003 | Suzuki et al. |
| 2004/0181570 A1 | 9/2004 | Kaneko et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler et al. |
| 2007/0235465 A1 | 10/2007 | Walker et al. |
| 2010/0036717 A1 | 2/2010 | Trest |
| 2010/0219953 A1 | 9/2010 | Bloy et al. |
| 2010/0228405 A1 | 9/2010 | Morgal et al. |
| 2010/0234991 A1 | 9/2010 | Zini et al. |
| 2010/0301056 A1 | 12/2010 | Wolfe |
| 2011/0130134 A1 | 6/2011 | Van Rysselberghe et al. |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1* | 3/2013 | Pinkus .................... H04L 67/12 713/160 |
| 2013/0282472 A1 | 10/2013 | Penilla et al. |
| 2013/0307698 A1 | 11/2013 | Park et al. |
| 2014/0022051 A1* | 1/2014 | Levien ................ G05D 1/0011 340/5.2 |
| 2014/0136414 A1* | 5/2014 | Abhyanker ............ G06Q 50/28 705/44 |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1* | 12/2014 | Ibanez-Guzman ......................... G05D 1/0027 701/23 |
| 2014/0380264 A1 | 12/2014 | Misra et al. |
| 2015/0006005 A1* | 1/2015 | Yu .......................... G06Q 10/08 701/22 |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1* | 6/2015 | Skaaksrud ............ H04W 12/06 705/333 |
| 2015/0170099 A1 | 6/2015 | Beach-Drummond et al. |
| 2015/0348112 A1 | 12/2015 | Ramanujam |
| 2016/0018224 A1* | 1/2016 | Isler ...................... G01C 21/005 701/25 |
| 2016/0033966 A1* | 2/2016 | Farris ..................... G01C 21/00 701/15 |
| 2016/0062583 A1* | 3/2016 | Ricci ....................... H04W 4/90 715/746 |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen et al. |
| 2016/0300187 A1* | 10/2016 | Kashi ................ G06Q 10/0836 |
| 2016/0334797 A1* | 11/2016 | Ross ........................ G08G 1/20 |
| 2016/0357187 A1* | 12/2016 | Ansari .................. G01S 15/931 |
| 2016/0357188 A1* | 12/2016 | Ansari .................. G05D 1/0212 |
| 2016/0358477 A1* | 12/2016 | Ansari .................. G08G 1/167 |
| 2016/0363991 A1 | 12/2016 | Schlecht et al. |
| 2017/0011580 A1 | 1/2017 | Huang et al. |
| 2017/0057516 A1* | 3/2017 | Gordon ................... B60W 40/08 |
| 2017/0075355 A1* | 3/2017 | Micks ................. G05D 1/0257 |
| 2017/0090480 A1* | 3/2017 | Ho ....................... G05D 1/0214 |
| 2017/0115125 A1* | 4/2017 | Outwater ............... H04W 4/40 |
| 2017/0124547 A1 | 5/2017 | Natarajan et al. |
| 2017/0124781 A1* | 5/2017 | Douillard ............ G01S 15/931 |
| 2017/0132934 A1* | 5/2017 | Kentley ................. G08G 1/202 |
| 2017/0132960 A1 | 5/2017 | Kis-Benedek et al. |
| 2017/0153714 A1 | 6/2017 | Gao et al. |
| 2017/0193434 A1 | 7/2017 | Shah et al. |
| 2017/0227962 A1* | 8/2017 | Cesarano ............. G05D 1/0214 |
| 2017/0248964 A1* | 8/2017 | Kentley ................. G01S 17/023 |
| 2017/0255198 A1* | 9/2017 | Rodriguez ........... G05D 1/0274 |
| 2017/0261977 A1 | 9/2017 | High et al. |
| 2017/0262790 A1* | 9/2017 | Khasis ................. G05D 1/0287 |
| 2017/0282859 A1* | 10/2017 | Grimm ................ H04L 9/0891 |
| 2017/0313421 A1* | 11/2017 | Gil ........................ H04W 4/70 |
| 2017/0323253 A1 | 11/2017 | Enssle et al. |
| 2018/0024554 A1* | 1/2018 | Brady .................. G05D 1/0088 |
| 2018/0025635 A1 | 1/2018 | Cheaz et al. |
| 2018/0033308 A1* | 2/2018 | Litkouhi .............. G05D 1/0088 |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |

(56) References Cited

U.S. PATENT DOCUMENTS

| | | |
|---|---|---|
| 2018/0099602 A1 | 4/2018 | Salter et al. |
| 2018/0101818 A1 | 4/2018 | Simms et al. |
| 2018/0134200 A1 | 5/2018 | Wilkinson et al. |
| 2018/0144300 A1 | 5/2018 | Wiechers et al. |
| 2018/0157984 A1* | 6/2018 | O'Herlihy ............... G06N 20/00 |
| 2018/0158018 A1 | 6/2018 | Luckay et al. |
| 2018/0165728 A1 | 6/2018 | McDonald et al. |
| 2018/0189716 A1 | 7/2018 | Crone et al. |
| 2018/0194411 A1 | 7/2018 | Liivik et al. |
| 2018/0196416 A1* | 7/2018 | Iagnemma ........... G05D 1/0011 |
| 2018/0196417 A1* | 7/2018 | Iagnemma ........... G05D 1/0011 |
| 2018/0211541 A1* | 7/2018 | Rakah .............. G08G 1/096844 |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti et al. |
| 2018/0330313 A1 | 11/2018 | Clarke et al. |
| 2018/0349872 A1 | 12/2018 | Ahmed et al. |
| 2018/0373246 A1* | 12/2018 | Laughlin .......... G06Q 10/06311 |
| 2018/0374002 A1* | 12/2018 | Li ........................ G06Q 10/02 |
| 2019/0023236 A1 | 1/2019 | Webb et al. |

FOREIGN PATENT DOCUMENTS

| | | |
|---|---|---|
| JP | 2006177843 A | 7/2006 |
| WO | WO-2013025803 A1 | 2/2013 |
| WO | WO-2015160782 A1 | 10/2015 |
| WO | WO-2017014544 A1 | 1/2017 |
| WO | WO-2017064202 A1 | 4/2017 |
| WO | WO-2019018695 A1 | 1/2019 |
| WO | WO-2019023518 A1 | 1/2019 |
| WO | WO-2019023519 A1 | 1/2019 |
| WO | WO-2019023521 A1 | 1/2019 |
| WO | WO-2019023522 A1 | 1/2019 |
| WO | WO-2019023615 A1 | 1/2019 |
| WO | WO-2019023686 A1 | 1/2019 |

OTHER PUBLICATIONS

PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
American National Standard for Safe Use of Lasers. ANSI ZI136.1-2000 (§4.5.1.5; 4.5.1.3-4 and p. 5) (19 pgs) (2000).
AN/TPS-43 Radar System Westinghouse. Westinghouse (pp. 3, 4, 6, 9 & 14) (14 pgs) (2007).
Chen et al. 3d object proposals for accurate object class detection. In Advances in Neural Information Processing Systems, pp. 424-432 (2015).
Chen et al. Monocular 3d object detection for autonomous driving. In Proceedings of the IEEE Conference on Computer Vision and Pattern Recognition, pp. 2147-2156 (2016).
Chen et al. Multi-view 3d object detection network for autonomous driving. In IEEE CVPR, pp. 1907-1915 (2017).
Co-pending U.S. Appl. No. 16/040,418, filed Jul. 19, 2018.
Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/046,954, filed Jul. 26, 2018.
Co-pending U.S. Appl. No. 16/046,967, filed Jul. 26, 2018.
Co-pending U.S. Appl. No. 16/046,978, filed Jul. 26, 2018.
Co-pending U.S. Appl. No. 16/046,980, filed Jul. 26, 2018.
Co-pending U.S. Appl. No. 16/047,901, filed Jul. 27, 2018.
Co-pending U.S. Appl. No. 16/048,124, filed Jul. 27, 2018.
Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).
Engelcke et al. Vote3deep: Fast object detection in 3d point clouds using efficient convolutional neural networks. In Robotics and Automation (ICRA), 2017 IEEE International Conference on, pp. 1355-1361 (2017).
Food and Drugs Rule—Performance Standards for Light-Emitting Products 21 C.F.R. § 1040.10 (19 pgs) (2005).
Fox. vol. 6: Active Electro-Optical Systems. The Infrared & Electro-Optical Systems Handbook. (326 pgs) (1993).
Geiger et al. Vision meets robotics: The KITTI dataset. The International Journal of Robotics Research 32(11):1231-1237 (2013).
Girshick et al. Rich feature hierarchies for accurate object detection and semantic segmentation. In Computer Vision and Pattern Recognition (CVPR) 2014 IEEE Conference on, pp. 580-587 (2014).
Gustavson. Diode-laser radar for low cost weapon guidance. SPIE 1633(VII):21-32 (pp. 21, 27, 28, 31 & Fig. 3.3-1) (1992).
Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).
Kilpela. Precise pulsed time-of-flight laser range finder for industrial distance measurements. Review of Scientific Instruments 72:2197 (Apr. 2001).
Lahoud et al. 2d-driven 3d object detection in rgb-d images. In Proceedings of the IEEE Conference on Computer Vision and Pattern Recognition, pp. 4622-4630 (2017).
Liu et al. SSD: Single shot multibox detector. In European conference on computer vision, pp. 21-37. Springer (2016).
Maturana et al. Voxnet: A 3d convolutional neural network for real-time object recognition. In IEEE/RSJ International Conference on Intelligent Robots and Systems (7 pgs) (Sep. 2015).
Mousavian et al. 3d bounding box estimation using deep learning and geometry. In Computer Vision and Pattern Recognition (CVPR), pp. 7074-7082 (2016).
Qi et al. Pointnet++: Deep hierarchical feature learning on point sets in a metric space. NIPS (14 pgs) (2017).
Qi et al. Frustum PointNets for 3D Object Detection from RGB-D Data. In Computer Vision and Pattern Recognition (CVPR), pp. 918-927 (Apr. 2018).
Qi et al. Pointnet: Deep learning on point sets for 3d classification and segmentation. Proc. Computer Vision and Pattern Recognition (CVPR), pp. 652-660 (2017).
Qi et al. Volumetric and multi-view cnns for object classification on 3d data. In Proceedings Computer Vision and Pattern Recognition (CVPR), pp. 5648-5656 (2016).
Ren et al. Accurate single stage detector using recurrent rolling convolution. In Computer Vision and Pattern Recognition (CVPR), pp. 5420-5428 (2017).
Ren et al. Faster r-cnn: Towards real-time object detection with region proposal networks. In Advances in neural information processing systems, pp. 91-99 (2015).
Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision-ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).

(56) References Cited

OTHER PUBLICATIONS

Su et al. Multi-view convolutional neural networks for 3d shape recognition. In Proceedings of the IEEE Conference on Computer Vision and Pattern Recognition, pp. 945-953 (2015).
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Rescue Robotics (SSRR) INSPEC Accession No. 17315970 (2017).
Qi et al. Frustum PointNets for 3D Object Detection from RGB-D Data. Available from https://arxiv.org/pdf/1711.08488v1.pdf (15 pgs.) (Nov. 2017).
Co-pending U.S. Appl. No. 16/119,939, filed Aug. 31, 2018.
Emerging Tech. Domino's has built a self-driving pizza delivery robot. Available at https://www.digitaltrends.com/cool-tech/dominos-pizza-delivery-robot/ (12 pgs) (2016).
Olson. Self-Driving Robots Will Start Delivering Food For Just Eat And Others. Available at https://www.forbes.com/sites/parmyolson/2016/07/05/self-driving-robots-food-delivery-just-eat/#6e3e834b280d (3 pgs) (2016).
PCT/US2018/043986 International Search Report and Written Opinion dated Oct. 23, 2018.
PCT/US2018/044155 International Search Report and Written Opinion dated Oct. 15, 2018.
PCT/US2018/044248 International Search Report and Written Opinion dated Oct. 24, 2018.
Pettitt. Forget delivery drones, meet your new delivery robot. Available at https://www.cnbc.com/2015/11/02/forget-delivery-drones-meet-your-new-delivery-robot.html (5 pgs) (2015).
U.S. Appl. No. 16/046,954 Office Action dated Nov. 29, 2018.
U.S. Appl. No. 16/048,124 Office Action dated Nov. 1, 2018.
Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).
U.S. Appl. No. 16/046,967 Office Action dated Dec. 4, 2018.
U.S. Appl. No. 16/047,901 Office Action dated Dec. 11, 2018.
Curtis et al., Skype founders invent self-driving robot that can deliver groceries for L1. London Telegraph (3 pgs) (2015).
Navarro et al. A mobile robot vending machine for beaches based on customer's preferences and multivariate methods. Procedia—Social and Behavioral Sciences 175:122-129 (2015).
Peters. The Grocery Store, of the Future is Mobile, Self-Driving and Run by AI. Fast Company (6 pgs.) (Jun. 13, 2017).
Ratkov. Robotic Vending Machines Anthonyratkkov.conn/robotics/robotic vending machines (2 pgs.) (2010).
U.S. Appl. No. 16/046,978 Office Action dated Feb. 28, 2019.
U.S. Appl. No. 16/046,980 Office Action dated Feb. 27, 2019.
U.S. Appl. No. 16/046,967 Office Action dated Mar. 28, 2019.
U.S. Appl. No. 16/047,901 Office Action dated Mar. 28, 2019.

\* cited by examiner

AUTONOMOUS VEHICLE REPOSITIONING

CROSS REFERENCE

This application claims priority to U.S. Provisional Application No. 62/534,929, filed Jul. 20, 2017, the contents of which are incorporated herein by reference in its entirety.

BACKGROUND OF THE INVENTION

The field of autonomous and semi-autonomous vehicles is a growing field of innovation. Autonomous and semi-autonomous vehicles are being used for many purposes including warehouse inventory operations, household vacuuming, hospital delivery, sanitation, and military or defense applications.

SUMMARY OF THE INVENTION

Provided herein is a platform for distributing and navigating an autonomous or semi-autonomous fleet throughout a plurality of pathways, the platform comprising: the fleet comprising a plurality of autonomous or semi-autonomous vehicles wherein each autonomous or semi-autonomous vehicle comprises: an autonomous or semi-autonomous propulsion system; a locational sensor configured to measure a current vehicle location of the vehicle; a condition sensor configured to measure a current vehicle status; and a communication device configured to transmit the current vehicle location and the current vehicle status; and a server processor configured to provide a server application comprising: a database comprising a map of the plurality of pathways, wherein each pathway is associated with a pathway parameter comprising an autonomous driving safety factor and a speed factor; a communication module receiving the current vehicle location and the current vehicle status from the communication device; a dispatch module assigning one or more of the plurality of autonomous or semi-autonomous vehicles to a task destination based at least on the current vehicle location and the current vehicle status; and a navigation module applying a route calculation algorithm to determine a vehicle task route from the current vehicle location to the task destination based at least on the pathway parameter and the current vehicle status, wherein the vehicle task route comprises at least a portion of one of the plurality of pathways, wherein the communication device further directs the autonomous or semi-autonomous propulsion system of the autonomous or semi-autonomous vehicle based on the vehicle task route.

In some embodiments, the server application further comprises a demand database comprising a historical demand data associated with a geographic area, and wherein the geographic area comprises at least the task destination. In some embodiments, the server application further comprises a demand forecasting module applying a prediction algorithm to determine a predicted demand schedule for each of the autonomous or semi-autonomous vehicles based at least on the historical demand data, wherein the predicted demand schedule comprises a predicted demand task location within the geographic area and a predicted demand period. In some embodiments, the server application further comprises an interim repositioning module assigning an interim repositioning mode to each of the plurality of autonomous or semi-autonomous vehicles based at least on one or more of the predicted demand task location, the predicted demand period, the task destination, and the current vehicle status. In some embodiments, the interim repositioning mode comprises a depot mode corresponding to a depot location, a parking mode associated with one of a plurality of parking spot locations, and a hover mode associated with a set threshold hover distance from the task destination or the predicted demand task location. In some embodiments, the database further comprises the plurality of parking spot locations within the geographic area. In some embodiments, the application further comprises a parking distribution module determining a selected parking spot location for one or more of the plurality of autonomous or semi-autonomous vehicles based on the parking mode, the plurality of the parking spot locations, and at least one of the task destination and the predicted demand task location. In some embodiments, the navigation module further applies the route calculation algorithm to determine a vehicle repositioning route from the task destination: to the depot location, based on the depot mode; to the selected parking spot location, based on the parking mode; or to a vehicle hover route based on the hover mode. In some embodiments, the vehicle hover route comprises at least a portion of one of the plurality of pathways within the set threshold hover distance from the task destination or the predicted demand task location. In some embodiments, the communication device further directs the autonomous or semi-autonomous propulsion system of the autonomous or semi-autonomous vehicle to remain at the depot location, the selected parking spot location, or within the vehicle hover route for the predicted demand period. In some embodiments, the route calculation algorithm comprises a machine learning algorithm, a rule-based algorithm, or both. In some embodiments, the prediction algorithm comprises a machine learning algorithm, a rule-based algorithm, or both. In some embodiments, the current vehicle status comprises a vehicle power level, a vehicle stock, a vehicle hardware status, or any combination thereof. In some embodiments, at least one of the speed factor and the autonomous vehicle safety parameter comprises a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof. In some embodiments, the autonomous or semi-autonomous vehicle further comprises a sensor configured to measure a sensed data. In some embodiments, the database further stores at least one of the current vehicle location, the current vehicle status, and the sensed data. In some embodiments, the pathway parameter is based at least on the sensed data. In some embodiments, at least one of the safety factor and the speed factor are based on the sensed data. In some embodiments, the sensed data enables crowd sourced safety factor and speed factor determination. In some embodiments, the application further comprises a pathway parameter prediction module predicting a future pathway parameter based at least on the sensed data. In some embodiments, the route calculation algorithm further determines the vehicle task route based on the predicted road parameter. In some embodiments, the autonomous or semi-autonomous vehicle further comprises a sensor configured to measure a sensed data, and wherein the sensed data corresponds to a parking spot status of one or more of the plurality of parking spot locations within the geographic area. In some embodiments, the parking distribution module further determines the selected parking spot location based on the parking spot status. In some embodiments, the server application further comprises a display module displaying at least one of the current vehicle location, the current vehicle status, the task destination, the pathway parameter, the task route, the selected parking spot location, and the predicted demand task location.

Another aspect provided herein is a vehicle fleet, comprising a plurality of autonomous or semi-autonomous vehicles operating autonomously or semi-autonomously and a fleet management module for coordination of the vehicle fleet, the fleet management module coordinating the activity and positioning of each autonomous or semi-autonomous vehicle in the fleet, the fleet configured to monitor, collect, and report data and capable of operating in an unstructured open or closed environment, each autonomous or semi-autonomous vehicle in the fleet comprising: a conveyance system; a power system; a navigation module for navigation in unstructured open or closed environment; at least one communication module adapted to transmit data from each autonomous or semi-autonomous vehicle to at least one of: the fleet management module, a user, and/or other autonomous or semi-autonomous vehicles in the fleet, and to receive instructions from the fleet management module or a user; a sensor system comprising a plurality of sensors configured to detect the environment around the autonomous or semi-autonomous vehicle; and at least one processor configured to manage the conveyance system, the power system, the navigation module, the sensor system, and the at least one communication module, and to assess the data provided by the autonomous or semi-autonomous vehicle sensors as it relates to the autonomous or semi-autonomous vehicle's navigation.

In some embodiments, the user comprises: a fleet manager, a sub-contracting vendor, a service provider, a customer, a business entity, a government entity, an individual, or a third-party. In some embodiments, the fleet management module is controlled by a user. In some embodiments, the unstructured open environment is a non-confined geographic region accessible by navigable pathways comprising one or more of: public roads, private roads, bike paths, open fields, open public lands, open private lands, pedestrian walkways, lakes, rivers, streams, and open airspace; and wherein the closed environment is a confined, enclosed or semi-enclosed structure accessible by navigable pathways comprising one or more of: open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, and pedestrian walkways. In some embodiments, the navigation system controls routing of the conveyance system of each autonomous or semi-autonomous vehicle in the fleet in the unstructured open or closed environments.

In some embodiments, the communication occurs via wireless transmission. In some embodiments, each autonomous or semi-autonomous vehicle is configurable to receive wireless transmissions from the user. In some embodiments, the user's wireless transmission interactions occur via mobile application and are transmitted by an electronic device and forwarded to the at least one communication module via one or more of: a central server, the fleet management module, and a mesh network. In some embodiments, the vehicle fleet wireless transmission interactions from each autonomous or semi-autonomous vehicle communication module are forwarded to the user or a plurality of users via: a central server; a fleet management module; and/or a mesh network. In some embodiments, the vehicle fleet wireless transmission interactions from each autonomous or semi-autonomous vehicle communication module comprise one or more of: road and pathway conditions, road and pathway information, traffic speed, traffic congestion, weather conditions, parking violations, public utility issues, street light issues, traffic light issues, the current state of street lighting and traffic lighting, pedestrian density, pedestrian traffic, animals, alternative vehicular traffic, area surveillance, waterway conditions, bridge inspection, internal and external structural inspection, and foliage inspection.

In some embodiments, the electronic device comprises one or more of: a smart phone, a personal mobile device, a personal digital assistant (PDA), a desktop computer, a laptop computer, a tablet computer, and a wearable computing device. In some embodiments, the plurality of sensors comprises one or more of: a still camera, a video camera, a perspective projection-type sensor, a microphone, an infrared sensor, a RADAR, a LiDAR, an altimeter, and a depth finder. In some embodiments, the sensor system further comprises conveyance system sensors configured to: monitor drive mechanism performance, monitor a power system level, or monitor a drive train performance. In some embodiments, said sensors are further configured to report sensor readings remotely to the fleet management module through the at least one communication module. In some embodiments, each autonomous or semi-autonomous vehicle further comprises a storage or memory device, wherein data collected from the sensor system is retrievably stored. In some embodiments, each autonomous or semi-autonomous vehicle further comprises a communications port for wired communication between the autonomous or semi-autonomous vehicle and an external digital processing device.

In some embodiments, each autonomous or semi-autonomous vehicle further comprises a software module, executed by the at least one processor, to apply one or more algorithms to data collected from the plurality of sensors to assess and store to the memory device, one or more of: road and pathway conditions, road and pathway information, traffic speed, traffic congestion, weather conditions, parking violations, public utility issues, street light issues, traffic light issues, the current state of street lighting and traffic lighting, pedestrian density, pedestrian traffic, animals, alternative vehicular traffic, area surveillance, waterway conditions, bridge inspection, internal and external structural inspection, and foliage inspection. In some embodiments, the at least one communication module is further configured to receive and respond to commands from the user to: select or change destinations for monitoring, select or change the order of destinations monitored, select or change the routing to destinations to be monitored, report geo-positioning of the autonomous or semi-autonomous vehicle, report a condition of the autonomous or semi-autonomous vehicle, report a speed of the autonomous or semi-autonomous vehicle, or report an ETA for arrival at a destination. In some embodiments, each autonomous or semi-autonomous vehicle is configured with a maximum speed range from 13 mph to 90 mph.

In some embodiments, said vehicle fleet is controlled directly by a user. In some embodiments, a plurality of said autonomous or semi-autonomous vehicles within the fleet is operated on behalf of a third-party vendor or third-party service provider. In some embodiments, a plurality of said autonomous or semi-autonomous vehicles within the fleet is further configured to be part of at least one sub-fleet comprising a sub-plurality of autonomous or semi-autonomous vehicles, each sub-fleet configured to operate independently or in tandem with the fleet. In some embodiments, each autonomous or semi-autonomous vehicle is configured with a forward mode, a reverse mode, and a park mode. In some embodiments, a plurality of the autonomous or semi-autonomous vehicles in the fleet is configured as secondary autonomous or semi-autonomous vehicles having at least one half the size of the other fleet autonomous or semi-autonomous vehicles, wherein the smaller secondary autonomous or semi-autonomous vehicles are stand-alone vehicles having all of the same capabilities of any other autonomous or semi-autonomous vehicle in the fleet. In some embodiments, the secondary autonomous or semi-autonomous vehicles are configurable for storage in one or more securable compartments found in a plurality of autonomous or semi-autonomous vehicles in the fleet. In some embodiments, the secondary autonomous or semi-autonomous vehicles are separable from the autonomous vehicle and configurable for secondary duties.

In some embodiments, each autonomous or semi-autonomous vehicle is configured with a "crawl" or "creep" speed comprising a speed range between about 0.01 mph to about 13.0 mph. In some embodiments, the secondary autonomous or semi-autonomous vehicles are configured with a maximum speed range from 13.0 mph to about 90.0 mph. In some embodiments, the secondary autonomous or semi-autonomous vehicles are configured with a "crawl" or "creep" speed comprising a speed range between about 0.01 mph to about 13.0 mph. In some embodiments, the secondary autonomous or semi-autonomous vehicles are configured with a sensor system comprising one or more of: a still camera, a video camera, a LiDAR, a RADAR, an ultrasonic sensor, a microphone, an altimeter, and a depth finder. In some embodiments, the secondary autonomous or semi-autonomous vehicles are configured with internal computer processing capacity. In some embodiments, the secondary autonomous vehicles are configured with a forward mode, a reverse mode, and a park mode.

Another aspect provided herein provides an autonomous or semi-autonomous vehicle fleet, comprising a plurality of autonomous or semi-autonomous vehicles operating autonomously or semi-autonomously and a fleet management module for coordination of the vehicle fleet, the fleet management module coordinating the activity and positioning of each autonomous or semi-autonomous vehicle in the fleet, the fleet configured to monitor, collect, and report data and capable of operating in an unstructured open or closed environment, each autonomous or semi-autonomous vehicle in the fleet comprising: a conveyance system, a power system, a navigation module for navigation in the unstructured open or closed environments, at least one communication module configurable to: transmit data from each autonomous or semi-autonomous vehicle to at least one of: the fleet management module, a user, other autonomous or semi-autonomous vehicles in the fleet, and between autonomous or semi-autonomous vehicles of the fleet; transmitted data relating to at least the conditions in the environment around the autonomous or semi-autonomous vehicle; store data from each autonomous or semi-autonomous vehicle to a memory device; and receive instructions from the fleet management module or a user; a sensor system comprising a plurality of sensors configured to detect the environment around the autonomous or semi-autonomous vehicle; at least one processor configured to manage the conveyance system, the power system, the navigation module, the sensor system, and the at least one communication module, and to assess the data provided by the autonomous or semi-autonomous vehicle sensors as it relates to the autonomous or semi-autonomous vehicle's navigation; and a software module, executed by the at least one processor, to apply one or more algorithms to data collected from the plurality of sensors to identify, document, and store to a memory device, one or more of: road and pathway conditions, high definition map data, traffic speed, traffic congestion, weather conditions, parking violations, public utility issues, street light issues, traffic light issues, the current state of street lighting and traffic lighting, pedestrian density, pedestrian traffic, animals, alternative vehicular traffic, area surveillance, waterway conditions, bridge inspection, internal and external structural inspection, and foliage inspection.

This disclosure relates to an autonomous or semi-autonomous vehicle fleet comprising a plurality of vehicles, in particular vehicles for transporting or retrieving deliveries in either unstructured outdoor environment or closed environments. This disclosure further relates to a vehicle fleet comprising a plurality of autonomous vehicles operating autonomously or semi-autonomously and a fleet management module for coordination of the vehicle fleet, each autonomous vehicle configured to; monitor, collect, and report data while capable of operating in an unstructured open or closed environment.

Provided herein is a vehicle fleet, comprising a plurality of autonomous or semi-autonomous vehicles and a fleet management module (associated with a central server) for coordination of the vehicle fleet. The fleet management module coordinates the activity, location and positioning of each autonomous or semi-autonomous vehicle in the fleet, wherein the fleet is configured to monitor, collect, and report data while capable of operating in an unstructured open or closed environment.

In some embodiments, the vehicle fleet is alternately configured for selling and delivering goods, comprising a plurality of compartments to deliver/sell one or more goods; responding to scheduled or immediate/on-demand requests and/or positioning based on anticipated demand; having temperature controlled compartments to allow for hot or cold items; carrying preloaded goods with anticipated demand based on where to go and what to load.

In some embodiments, the vehicle fleet is configured such that a customer, user, or a plurality of users are able to summon one or more autonomous or semi-autonomous vehicles through mobile (phone/tablet/watch/laptop) applications for specified delivery or for mobile marketplace to come to them. In some embodiments, the customer, a user, or a plurality of users have the option to additionally specify an exact location on a map for the vehicle (e.g., by dropping pin, etc), for a specified delivery or pickup.

In some embodiments, the vehicle fleet is configured to provide one or more services such as: delivery services, advertising services, land survey services, patrol services, monitoring services, traffic survey services, signage and signal survey services, and architectural building or road infrastructure survey services. In some embodiments, the vehicle fleet services comprise "White Label" services involving the delivery or representation of "White Label" products or services.

In some embodiments, each autonomous or semi-autonomous vehicle in the vehicle fleet is equipped with at least one processor capable of both a high-level computing capacity for processing, as well as low-level safety critical computing capacity for controlling the hardware. In some embodiments, each autonomous or semi-autonomous vehicle in the fleet comprises a conveyance system (e.g., a drive system with a propulsion engine, wheels, wings, rotors, blowers, rockets, propellers, brakes, etc.) and a power source.

In some embodiments, each autonomous or semi-autonomous vehicle in the fleet comprises a navigation module for navigation in the unstructured open or closed environments (e.g., digital maps, GPS, etc.). In some embodiments, each autonomous or semi-autonomous vehicle in the fleet comprises at least one communication module adapted to transmit data from the autonomous or semi-autonomous vehicle to at least one of: the fleet manager, a user, or other autonomous or semi-autonomous vehicles.

In some embodiments, each autonomous or semi-autonomous vehicle in the fleet comprises: at least one communication module configurable to receive, store, and transmit data to a user or plurality of users and the autonomous or semi-autonomous vehicles in the fleet; between the autonomous or semi-autonomous vehicles of the fleet; and between the user or plurality of users and the autonomous or semi-autonomous vehicles in the fleet, the transmitted data being related to at least the conditions in the environment and the vehicle fleet interactions; a sensor system comprising a plurality of sensors configured to assess the environment around the autonomous or semi-autonomous vehicle; at least one processor configured to manage the conveyance system, the power system, the navigation module, the sensor system, and the at least one communication module; and a software module, executed by the at least one processor to apply one or more algorithms to data collected from the plurality of sensors to identify, document, and store to a memory device, one or more of: road and pathway conditions (damaged roads, pot holes), construction, road blockages, detours, traffic flow, traffic speed, traffic congestion, accidents, behavior of road users, weather conditions, parking violations, public utility issues, street light issues, traffic light issues, the current state of street lights and traffic lights, signage issues, pedestrian density/traffic, pedestrian behaviors, animals, alternative vehicular traffic (e.g., motorcycles, mopeds, bicycles, wheelchairs, strollers, etc.), customer/pedestrian flow through an area, area surveillance, parking space utilization, bridge inspection, internal and external structural inspection, and foliage inspection.

In some embodiments, the surveillance applications are expandable to include detecting and/or recognizing people, vehicles, objects, moving objects in certain areas, such as the number of cars in parking lot, the number of customers or people entering and exiting buildings, etc.

In some embodiments, the inspection applications are expandable to include businesses, offices, residences, buildings, and structure inspection. In some embodiments, the monitoring applications are expandable to include business information such as: names of businesses, addresses, types of businesses, and real-time attributes including crowding in businesses, parks, and shopping malls at any given time. In some embodiments, the data collected from the sensors are utilized to update HD maps and contextual maps, construction areas, road closures, road work, congested areas, etc. In some embodiments, the unstructured open environment is a non-confined geographic region accessible by navigable pathways comprising: public roads, private roads, bike paths, pedestrian walkways, or open airspace. In some embodiments, the closed environment is a confined, enclosed, or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the navigation system controls routing of the conveyance system of the autonomous or semi-autonomous vehicles in the fleet in the unstructured open or closed environments. In some embodiments, the communication to the user or plurality of users, to the fleet management module, to the autonomous or semi-autonomous vehicles in the fleet, between the autonomous or semi-autonomous vehicles of the fleet, and between the user or plurality of users and the autonomous or semi-autonomous vehicles in the fleet of the received, stored, and transmitted data, and the vehicle fleet interactions occurs via wireless transmission.

In some embodiments, the users' or plurality of users' wireless transmission interactions occur via mobile application transmitted by an electronic device and forwarded to the at least one communication module via: a central server, a fleet management module, and/or a mesh network.

In some embodiments, the vehicle fleet wireless transmission interactions from each autonomous or semi-autonomous vehicle communication module are forwarded to a user or a plurality of users via: a central server, a fleet management module, and/or a mesh network. In some embodiments, the electronic device comprises: a phone, a personal mobile device, a personal digital assistant (PDA), a mainframe computer, a desktop computer, a laptop computer, a tablet computer, and/or a wearable computing device comprising: a communication headset, smart glasses, a contact lens or lenses, a digital watch, a bracelet, a ring, jewelry, or a combination thereof.

In some embodiments, the plurality of sensors comprises one or more of: a still camera, a video camera, a perspective projection-type sensor, a microphone, an infrared sensor, an ultrasonic sensor, a radar sensor, a LiDAR sensor, an altimeter, and a depth finder.

In some embodiments, the autonomous or semi-autonomous vehicles of the vehicle fleet further comprise conveyance system sensors configured to monitor drive mechanism performance (e.g., propulsion engine), monitor power system levels (e.g., battery, solar, gasoline, propane), or monitor drive train performance (e.g., transmission, tires, treads, brakes, rotors, blowers, propellers, etc.).

In some embodiments, the sensors are further configured to transmit sensor readings remotely to the fleet manager via the at least one communication module. In some embodiments, the sensors are further configured to report sensor readings remotely to the user or plurality of users through the at least one communication module. In some embodiments, the at least one communication module is further configured to receive and respond to commands from the user or plurality of users to: select or change destinations for monitoring, select or change the order of destinations monitored, select or change the routing to destinations to be monitored, report geo-positioning of the autonomous or semi-autonomous vehicle, report condition of the autonomous or semi-autonomous vehicle (e.g., fuel supply, accidents, component failure), report speed of autonomous or semi-autonomous vehicle, or report ETA for arrival at a destination.

In some embodiments, the vehicle fleet is configured as land vehicles. In some embodiments, the land vehicle autonomous or semi-autonomous vehicles in the fleet are configured with a maximum speed range from 13.0 mph to about 90.0 mph.

In some embodiments, the land vehicle autonomous or semi-autonomous vehicles in the fleet are configured with a "crawl" or "creep" speed comprising a speed range between about 0.01 mph to about 1.0 mph. In some embodiments, the land vehicle autonomous or semi-autonomous vehicles in the fleet are configured with a "crawl" or "creep" speed comprising a speed range between about 0.01 mph to about 5.0 mph. In some embodiments, the land vehicle autonomous or semi-autonomous vehicles in the fleet are configured with a "crawl" or "creep" speed comprising a speed range between about 0.01 mph to about 10.0 mph. In some embodiments, the land vehicle autonomous or semi-autonomous vehicles in the fleet are configured with a "crawl" or "creep" speed comprising a speed range between about 0.01 mph to about 13.0 mph. In some embodiments, the land vehicle autonomous or semi-autonomous vehicles in the fleet are configured with an operating speed range from about 0.01 mph to about 90.0 mph.

In some embodiments, the maximum speeds are dictated by the hardware and software present in the autonomous or semi-autonomous vehicle. In some embodiments, the maximum speeds allow for operation on open roads, bike paths, and other environments where higher speeds are appropriate.

In some embodiments, the operating speeds in any given environment are governed by on-board the sensors that monitor environmental conditions, the operating environment, etc. to determine an appropriate speed at any given time.

In some embodiments of the fleet, a plurality of the autonomous or semi-autonomous vehicles comprises secondary autonomous or semi-autonomous vehicles, which are configurable as stand-alone vehicles capable of functioning in a manner similar to any other autonomous or semi-autonomous vehicle in the fleet.

In some embodiments of the fleet, the secondary autonomous or semi-autonomous vehicles are components of the land vehicle, separable from the land vehicle and configured for secondary duties, such as: acquiring soil, water, or air samples; acquiring close-up pictures; accessing small or confined areas that are too small for the larger autonomous or semi-autonomous vehicle to enter; or transporting a component or package from the autonomous or semi-autonomous vehicle on a street or sidewalk to a door, drop box, or nearby secondary location. In some embodiments, the secondary autonomous or semi-autonomous vehicles are configured for transporting a component or package to the entrance of a building or inside of a building.

In some embodiments, the secondary autonomous or semi-autonomous vehicles are smaller land-based autonomous or semi-autonomous vehicles. In some embodiments, the secondary autonomous or semi-autonomous vehicles are aerial drones. In some embodiments, the secondary autonomous or semi-autonomous vehicles are water craft. In some embodiments, the secondary autonomous or semi-autonomous vehicles are transported in a storage compartment of the land vehicle autonomous or semi-autonomous vehicle. In some embodiments, the secondary autonomous or semi-autonomous vehicles are transported on top of the land vehicle autonomous or semi-autonomous vehicle. In some embodiments, the secondary autonomous or semi-autonomous vehicles are configured for automated extraction from the storage compartment of the land autonomous or semi-autonomous vehicle. In some embodiments, the secondary autonomous or semi-autonomous vehicles are configured for assisted automated extraction from the storage compartment of the land autonomous vehicle, wherein the land autonomous or semi-autonomous vehicle provides ramps, platforms, or lifts to assist with the extraction of the secondary autonomous vehicle from a compartment of the land autonomous or semi-autonomous vehicle.

In some embodiments, the secondary autonomous vehicles are configured with a maximum speed range from 1.0 mph to about 13.0 mph. In some embodiments, the secondary autonomous vehicles are configured with a maximum speed range from 1.0 mph to about 90.0 mph. In some embodiments, the secondary autonomous vehicles are configured with a "crawl" or "creep" speed comprising a speed range between about 0.01 mph to 1.0 mph. In some embodiments, the land autonomous or semi-autonomous vehicles in the fleet are configured with a "crawl" or "creep" speed comprising a speed range between about 0.01 mph to about 5.0 mph. In some embodiments, the land autonomous or semi-autonomous vehicles in the fleet are configured with a "crawl" or "creep" speed comprising a speed range between about 0.01 mph to about 10.0 mph. In some embodiments, the land autonomous or semi-autonomous vehicles in the fleet are configured with a "crawl" or "creep" speed comprising a speed range between about 0.01 mph to about 13.0 mph.

In some embodiments, the vehicle fleet is fully-autonomous. In some embodiments, the vehicle fleet is semi-autonomous. In some embodiments, the vehicle fleet is controlled directly by a user or plurality of users. In some embodiments, a plurality of said autonomous vehicles within the fleet is operated on behalf of a third-party vendor/service provider. In some embodiments, the autonomous vehicles in the fleet are configured for land travel as a land vehicle. In some embodiments, the autonomous vehicles in the fleet are configured for water travel as a watercraft vehicle. In some embodiments, the autonomous vehicles in the fleet are configured for hover travel as an over-land or over-water hovercraft vehicle. In some embodiments, the autonomous vehicles in the fleet are configured for air travel as an aerial drone or aerial hovercraft vehicle.

In some embodiments, a plurality of said autonomous or semi-autonomous vehicles within the fleet is further configured to be part of a sub-fleet comprising a sub-plurality of autonomous or semi-autonomous vehicles; each sub-fleet is configured to operate independently or in tandem with the vehicle fleet.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Although governmental organizations, non-governmental organizations, and contractors are tasked with monitoring the status of the infrastructure to ensure the maintenance and safety of public and private utilities, such manual inspections are costly and tedious given the vast expanse of roadways, pathways, and buildings. Although aerial infrastructure monitoring has been used to record and maintain agricultural and wilderness conditions, such manned systems are prohibitively expensive for vast monitoring and may not be configured for transportation through and inspection of ground level and urban infrastructure. Further, such infrastructure monitoring systems are incompatible to employ and append current infrastructure databases and support listings. As such, provided herein is a platform for determining a non-navigational quality of at least one infrastructure.

Provided herein is an autonomous or semi-autonomous vehicle fleet comprising a plurality of autonomous or semi-autonomous vehicles operating autonomously or semi-autonomously and a fleet management module for coordination of the autonomous or semi-autonomous vehicle fleet, each autonomous or semi-autonomous vehicle configured to monitor, collect, and report data while operating in an unstructured open or closed environment. In contrast to manned vehicles, autonomous and semi-autonomous vehicles may be required to collect and process additional types and forms of data for navigation than unmanned vehicles, to detect and respond to the surrounding environment, and to address challenges unique to those applications. Moreover, additional types and forms of data may be required for autonomous and semi-autonomous vehicles that are unmanned as such unmanned vehicles cannot rely upon an override or instruction by a passenger. As such, there is a current unmet need for systems, platforms, and methods to collect and process these additional types and forms of data for autonomous or semi-autonomous vehicles, whether manned or unmanned, and to navigate the vehicles based on this data.

The autonomous or semi-autonomous vehicle fleet herein may comprise a plurality of autonomous or semi-autonomous vehicles operating autonomously and a fleet management module for coordination of the autonomous or semi-autonomous vehicle fleet, each autonomous or semi-autonomous vehicle within the fleet configured to monitor, collect, and report data while capable of operating in an unstructured open or closed environment, each autonomous or semi-autonomous vehicle comprising, a conveyance system, a power system, a navigation module, a sensor system, at least one communication module, and at least one processor configured to manage the conveyance system, the power system, the navigation module, the sensor system, and the at least one communication module.

Fleet of Autonomous Vehicles

Figure 1:
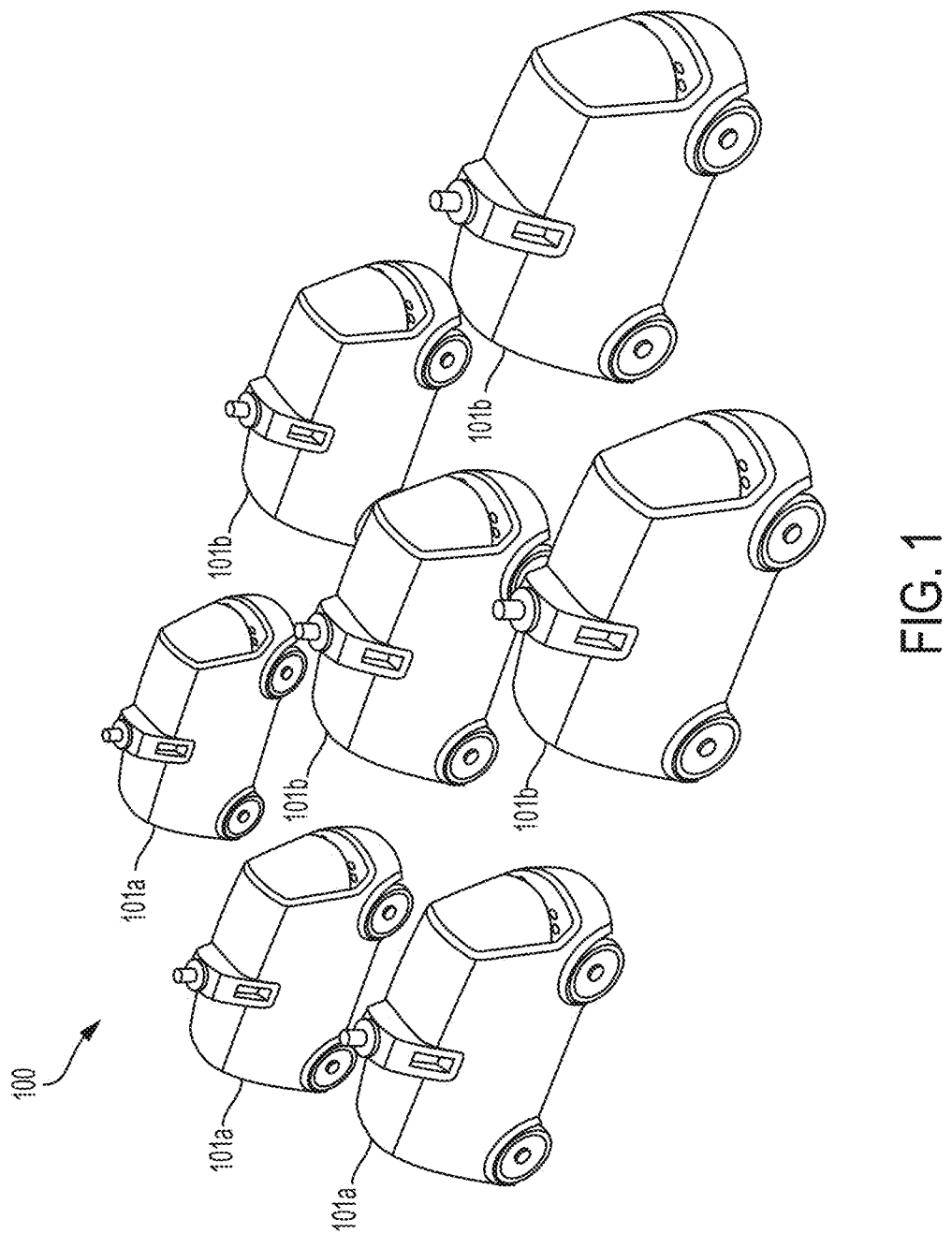
FIG. 1 is an exemplary view an autonomous vehicle fleet comprising two sub-fleets.
Figure 2:
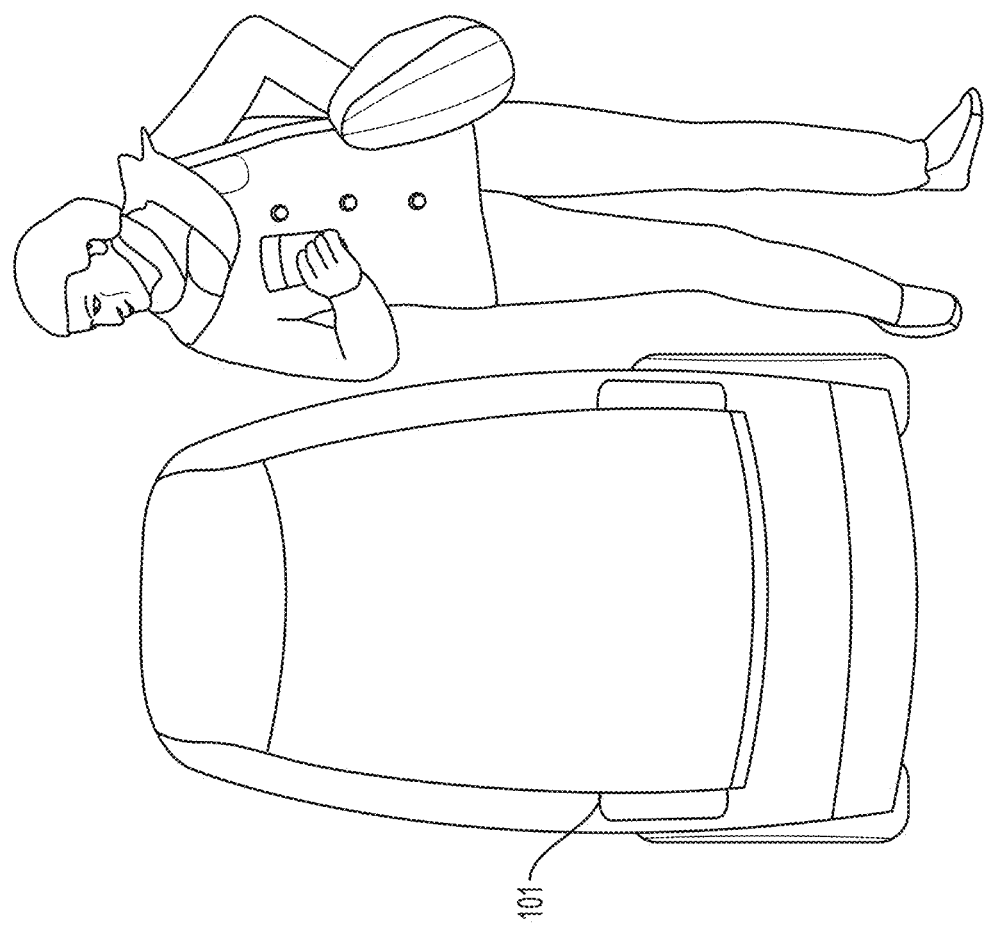
FIG. 2 is a front view of an exemplary autonomous vehicle beside a walking person, in accordance with some embodiments.

Provided herein, per FIG. 1 is an autonomous or semi-autonomous vehicle fleet 100 comprising a plurality of autonomous or semi-autonomous vehicles 101.

In some embodiments, the autonomous or semi-autonomous vehicle fleet 100 comprises at least a first sub-fleet of first fleet autonomous or semi-autonomous vehicles 101a and a second sub-fleet of second fleet autonomous or semi-autonomous vehicles 101b. Each sub-fleet may comprise 1, 2, 3, 4, 5, 10, 15, 20, 50, 100, 200, 300, 400, 500, 700, 1,000, 2,000, 3,000, 5,000, 10,000, or more autonomous or semi-autonomous vehicles 101. The two or more sub-fleets may operate independently or in tandem.

In a non-limiting example of the operations of sub-fleets of autonomous or semi-autonomous vehicles, an independent survey company rents or leases a sub-fleet of 10 autonomous or semi-autonomous vehicles 101 which are partially or completely dedicated to the tasks and/or services of the survey company. The sub-fleet may comprise a plurality "white label" vehicles displaying the logo of the survey company.

Autonomous or Semi-Autonomous Vehicles

As seen in FIGS. 2 to 5, the exemplary autonomous or semi-autonomous vehicle 101 may be configured for land travel. The vehicle 101 may have a width of about 2 to about 5 feet. The vehicle 101 may further exhibit a low mass, and a low center of gravity, or both, for stability.

In some embodiments, the vehicle 101 is configured to enable human interaction and/or override by a user or a fleet operator. The vehicle 101 or the semi-autonomous vehicle 101 may be configured to allow for direct control of the processors, conveyors, or sensors therein, by a fleet operator. Such direct control may allow for the safe return of the vehicle 101 to a base station for repair. In some embodiments, the vehicle 101 comprises a plurality of securable compartments 102 configured for transporting goods or equipment.

Further, each autonomous or semi-autonomous vehicle 101 may comprise a conveyance system configured to propel the autonomous or semi-autonomous vehicle 101. The conveyance system may comprise, for example, an engine, a wheel, a tread, a wing, a rotor, a blower, a rocket, a propeller, a brake, a transmission, or any combination thereof. The conveyance system may further comprise a power system configured to provide and/or store energy required to propel the autonomous or semi-autonomous vehicle 101.

Figure 3:
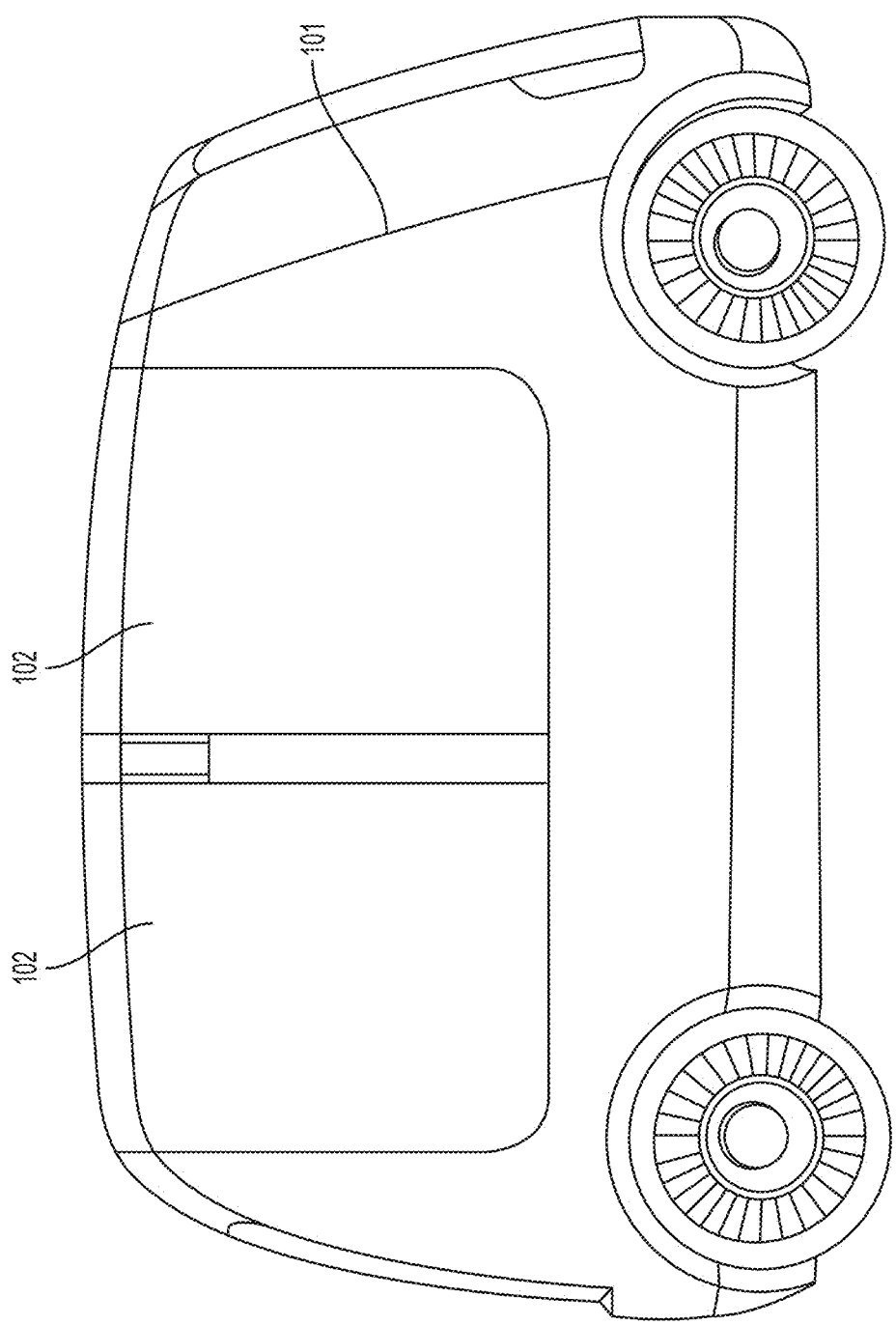
FIG. 3 is a right side view of an exemplary autonomous vehicle, in accordance with some embodiments.
Figure 4:
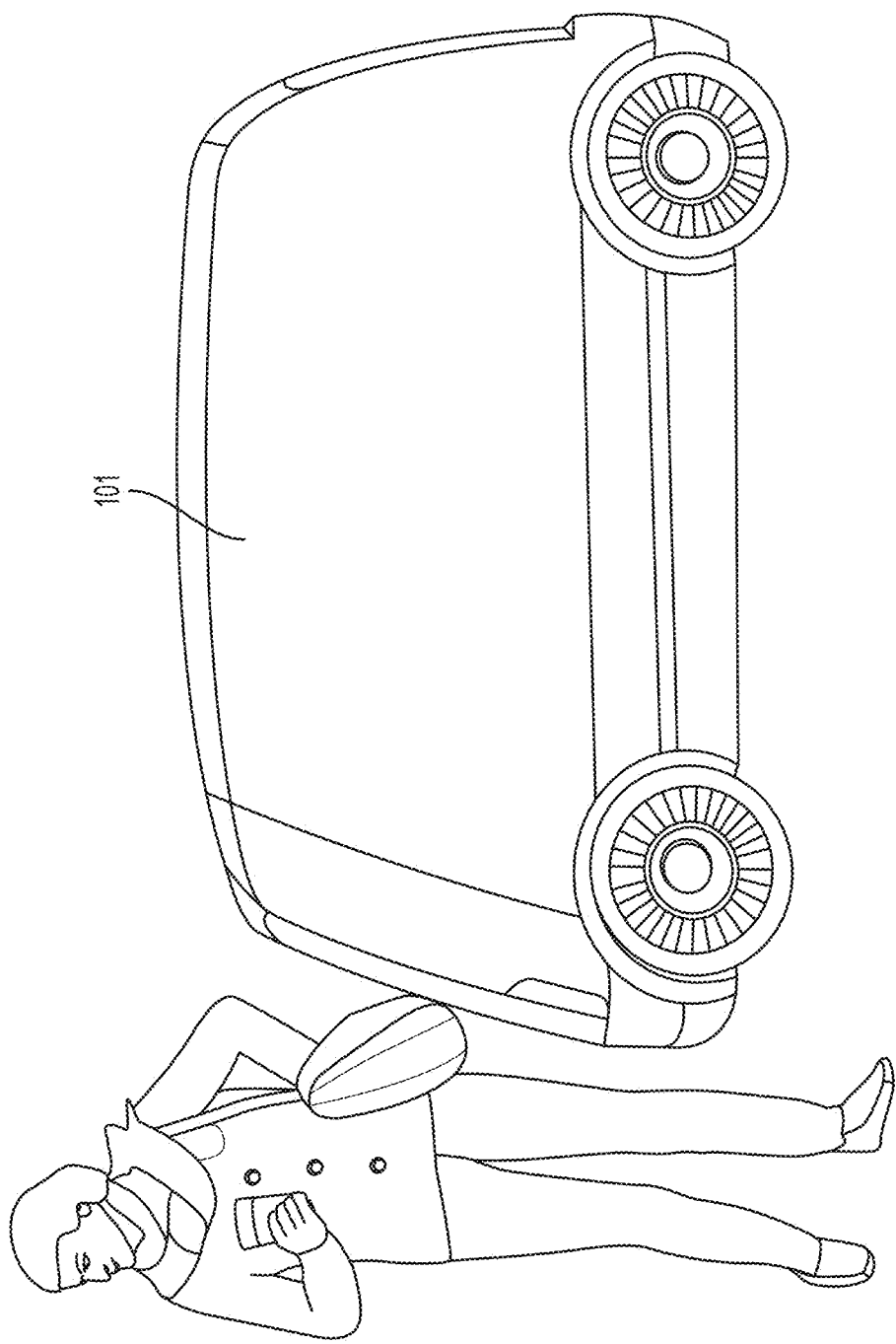
FIG. 4 is a left side view of an exemplary autonomous vehicle beside a walking person, in accordance with some embodiments.
Figure 5:
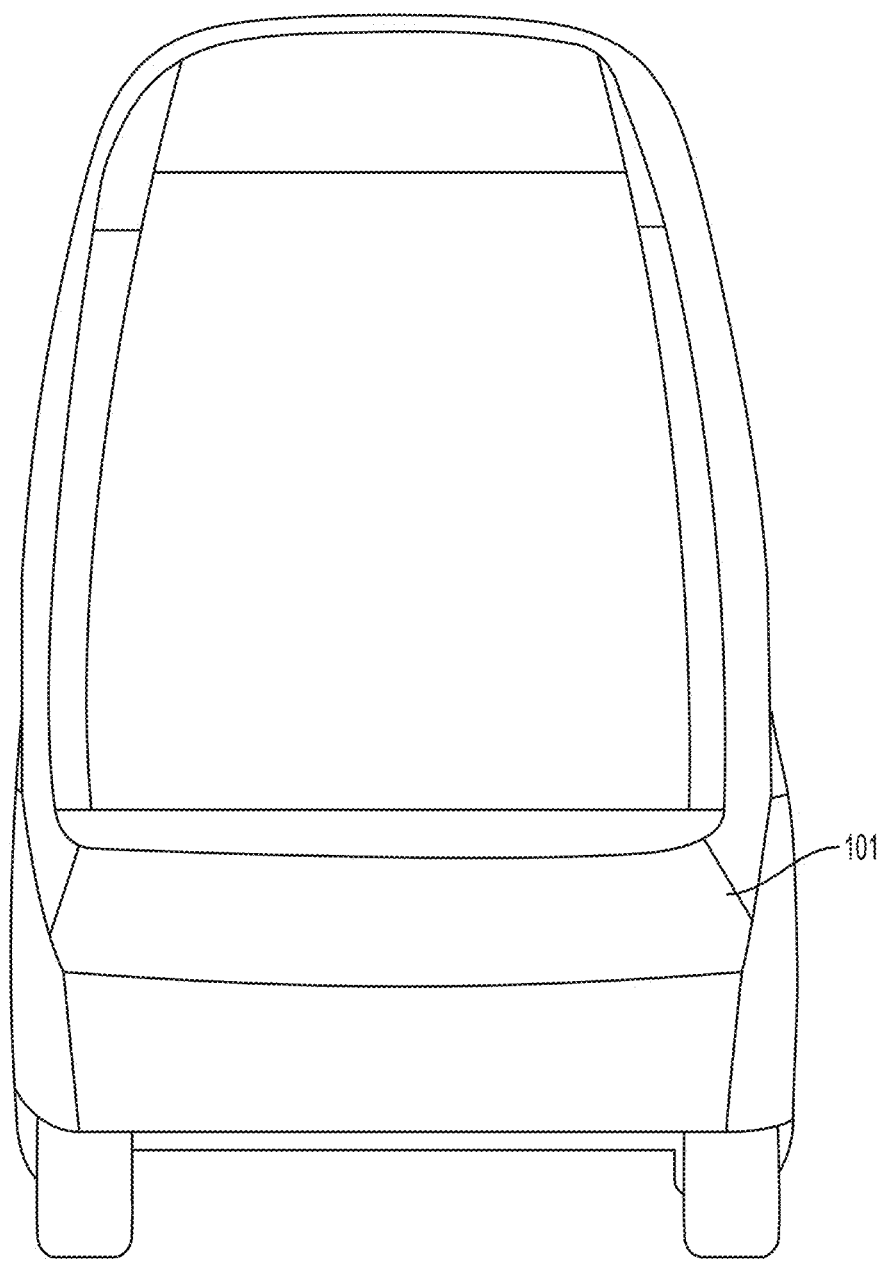
FIG. 5 is a back view of an exemplary autonomous vehicle, in accordance with some embodiments.

Per FIG. 3, the vehicle 101 may comprise a storage compartment 102. In some embodiments, the storage compartment 102 comprises 1, 2, 3, 4, 5, 6, 7, 8, 10, 15, 20, or more compartments 102. In some embodiments, the storage compartment 102 comprises a nested storage compartment, wherein a sub-storage compartment is located within another storage compartment 102. In some embodiments, the storage compartment 102 may be configured to carry a specific item or a range of items. In some embodiments, the storage compartment 102 is configured to hold a secondary autonomous or semi-autonomous vehicle.

Further, per FIG. 3, the vehicle 101 may comprise a sensor. The sensor may comprise one or a plurality of a still image camera, a video camera, a LiDAR, a RADAR, an ultrasonic sensor, a microphone, an altimeter, and a depth finder. In some embodiments, the sensor 301 comprises a conveyance system sensor configured to monitor at least one of the performance and the speed of the conveyance system. The conveyance system sensor may be configured to monitor power levels (e.g., battery, solar, gasoline, propane, etc.) or monitor drive train performance (e.g., transmission, tires, treads, brakes, rotors, blowers, propellers, etc.). In some embodiments, the sensor system is configured to monitor the surroundings of the vehicle 101 and to collect data regarding the unstructured open or closed environment. Further, each vehicle 101 may comprise an internal processor for navigation and obstacle avoidance.

The vehicle may be configured for land. In some embodiments, the vehicle comprises a car, a wagon, a van, a tricycle, a truck, a trailer, a bus, a railed vehicle, a train, a tram, a watercraft, a ship, a boat, a ferry, a landing craft, a barge, a raft, an aerial drone, an aerial hovercraft, a land hovercraft, a water hovercraft, an aircraft, a spacecraft, or any combination thereof. In some embodiments, the vehicle comprises a water vehicle, wherein the conveyance system comprises a gas engine, a turbine engine, an electric motor, a hybrid gas/electric engine, a propeller, a jet, or any combination thereof. In some embodiments, the vehicle comprises a hover vehicle, wherein the conveyance system comprises a blower, gas engine, a turbine engine, an electric motor, a hybrid gas/electric engine, a propeller, or any combination thereof. In some embodiments, the vehicle comprises a hover vehicle, wherein the conveyance system comprises a wing, a rotor, a blower, a rocket, a propeller, a gas engine, a turbine engine, an electric motor, a hybrid gas/electric engine, or any combination thereof.

In some embodiments, the vehicle comprises a land vehicle having a maximum speed of about 13 miles per hour (mph) to about 90 mph. In some embodiments, the vehicle comprises a water vehicle having a maximum speed of about 1 mph to about 45 mph. In some embodiments, the vehicle comprises an over-land or over-water hovercraft vehicle having a maximum speed of about 1 mph to about 60 mph. In some embodiments, the vehicle comprises an air vehicle (e.g., an aerial drone or aerial hovercraft) having a maximum speed of about 1 mph to 90 mph.

In some embodiments, the vehicle is configured with a forward speed mode, a reverse mode, and a park mode. In some embodiments the vehicle has a speed of about 13 mph to about 100 mph. Each land vehicle may also be configured to operate within a specific speed range to accommodate for a specific surrounding. The specific surrounding may comprise, for example, slow-moving traffic, pedestrian traffic, vehicle towing, automated parking, reverse driving, weather conditions, bike paths, inner-city transit, rural transit, residential transit, local roadway transit, state highway transit, and interstate highway transit. The surrounding of each vehicle may be determined by onboard or remote sensors and software. Safety measures may be implemented to further reduce speeds in certain situations, such as, for example, if the on-board navigation maps and sensors provide conflicting information, In some embodiments, the vehicle may respond to one or more of the surrounding conditions by entering "full stop," "crawl," or "creep" modes. Such modes may be enabled for navigating very tight situations, automated parking, other vehicles, or when preparing to stop.

In some embodiments, at least one of the "full stop," "crawl," or "creep" modes comprise a speed of about 0.01 mph to about 13 mph. In some embodiments, at least one of the full stop," "crawl," or "creep" modes comprise a speed of at least about 0.01 mph. In some embodiments, at least one of the "full stop," "crawl," or "creep" modes comprises a speed of at most about 13 mph. In some embodiments, at least one of the full stop," "crawl," or "creep" modes comprises a speed of about 0.01 mph to about 0.05 mph, about 0.01 mph to about 0.1 mph, about 0.01 mph to about 0.5 mph, about 0.01 mph to about 1 mph, about 0.01 mph to about 2 mph, about 0.01 mph to about 3 mph, about 0.01 mph to about 4 mph, about 0.01 mph to about 5 mph, about 0.01 mph to about 8 mph, about 0.01 mph to about 11 mph, about 0.01 mph to about 13 mph, about 0.05 mph to about 0.1 mph, about 0.05 mph to about 0.5 mph, about 0.05 mph to about 1 mph, about 0.05 mph to about 2 mph, about 0.05 mph to about 3 mph, about 0.05 mph to about 4 mph, about 0.05 mph to about 5 mph, about 0.05 mph to about 8 mph, about 0.05 mph to about 11 mph, about 0.05 mph to about 13 mph, about 0.1 mph to about 0.5 mph, about 0.1 mph to about 1 mph, about 0.1 mph to about 2 mph, about 0.1 mph to about 3 mph, about 0.1 mph to about 4 mph, about 0.1 mph to about 5 mph, about 0.1 mph to about 8 mph, about 0.1 mph to about 11 mph, about 0.1 mph to about 13 mph, about 0.5 mph to about 1 mph, about 0.5 mph to about 2 mph, about 0.5 mph to about 3 mph, about 0.5 mph to about 4 mph, about 0.5 mph to about 5 mph, about 0.5 mph to about 8 mph, about 0.5 mph to about 11 mph, about 0.5 mph to about 13 mph, about 1 mph to about 2 mph, about 1 mph to about 3 mph, about 1 mph to about 4 mph, about 1 mph to about 5 mph, about 1 mph to about 8 mph, about 1 mph to about 11 mph, about 1 mph to about 13 mph, about 2 mph to about 3 mph, about 2 mph to about 4 mph, about 2 mph to about 5 mph, about 2 mph to about 8 mph, about 2 mph to about 11 mph, about 2 mph to about 13 mph, about 3 mph to about 4 mph, about 3 mph to about 5 mph, about 3 mph to about 8 mph, about 3 mph to about 11 mph, about 3 mph to about 13 mph, about 4 mph to about 5 mph, about 4 mph to about 8 mph, about 4 mph to about 11 mph, about 4 mph to about 13 mph, about 5 mph to about 8 mph, about 5 mph to about 11 mph, about 5 mph to about 13 mph, about 8 mph to about 11 mph, about 8 mph to about 13 mph, or about 11 mph to about 13 mph. In some embodiments, at least one of the full stop," "crawl," or "creep" modes comprises a speed of about 0.01 mph, about 0.05 mph, about 0.1 mph, about 0.5 mph, about 1 mph, about 2 mph, about 3 mph, about 4 mph, about 5 mph, about 8 mph, about 11 mph, or about 13 mph.

In one exemplary embodiment, the land vehicle is configured with a traditional 4-wheeled automotive configuration comprising steering and braking systems. The drive may be a 2-wheel drive or 4-wheel all-terrain traction drive, and the propulsion system may comprise a gas engine, a turbine engine, an electric motor, a hybrid gas/electric engine, or any combination thereof. The autonomous or semi-autonomous vehicle may additionally comprise an auxiliary solar power system to provide back-up emergency power or power for minor low-power sub-systems.

In another exemplary embodiment, the water vehicle is configured to monitor, collect, and report data in public waterways, canals, dams, and lakes. As such, the water vehicle may be capable of monitoring and reporting conditions in flood disaster areas, and/or collect water samples.

Alternately, in some embodiments, while an autonomous or semi-autonomous vehicle is operating in an unstructured open environment, a large storage compartment may house a remote autonomous or semi-autonomous vehicle that may be automatically deployed.

Fleet Management Module

Figure 6:
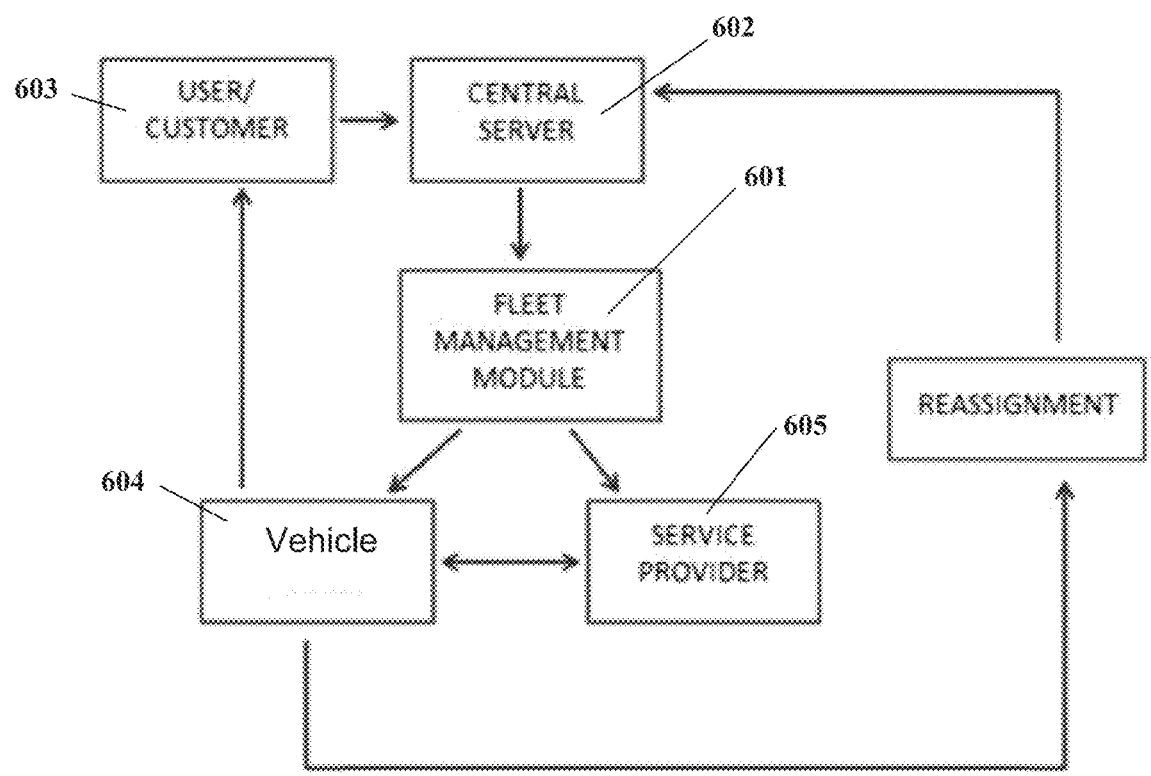
FIG. 6 is a flowchart of an exemplary fleet management control module, in accordance with some embodiments.

Provided herein, per FIG. 6, is a system for fleet management comprising a fleet management module 601, a central server 602, a vehicle 604, a customer 603, and a service provider 605. In some embodiments, the fleet management module 601 coordinates and assigns tasks, and monitors the position of each of the plurality of vehicles 604 in the fleet. The fleet management module 601 may coordinate the vehicles 604 in the fleet to monitor and collect data regarding unstructured open or closed environments, and report to the service provider 605. As seen, the fleet management module 601 may coordinate with a central server 602. The central server 602 may be located in a central operating facility owned or managed by the fleet owner. The service provider 605 may comprise a third party provider of a good or service.

In one example, an order by a customer 603 is transmitted to a central server 602, which then communicates with the fleet management module 601, which relays the order to the service provider 605 associated with the order and a vehicle 604. The fleet management module 601 may employ one or more vehicles 604 or sub-fleet vehicles that are closest to the service provider 605, customer 603, or both. The assigned service provider then interacts with that vehicle 604 through a service provider application to supply the vehicle 604 with any goods, maps, or instructions associated with the order. The vehicle 604 then travels to the customer 603 and reports completion of the order to at least one of the customer 603, the service provider 605, the central server 602, and the fleet management module 601.

In some embodiments the vehicle 604 may be operated on behalf of the service provider 605, wherein at least one of the central server 602 and the fleet management module 601 is operated by the service provider 605. In some embodiments, the vehicle 604 is controlled directly by the user 603. In some embodiments, human interaction of the vehicle 604 may be required to address maintenance issues such as mechanical failure, electrical failure or a traffic accident.

Figure 7:
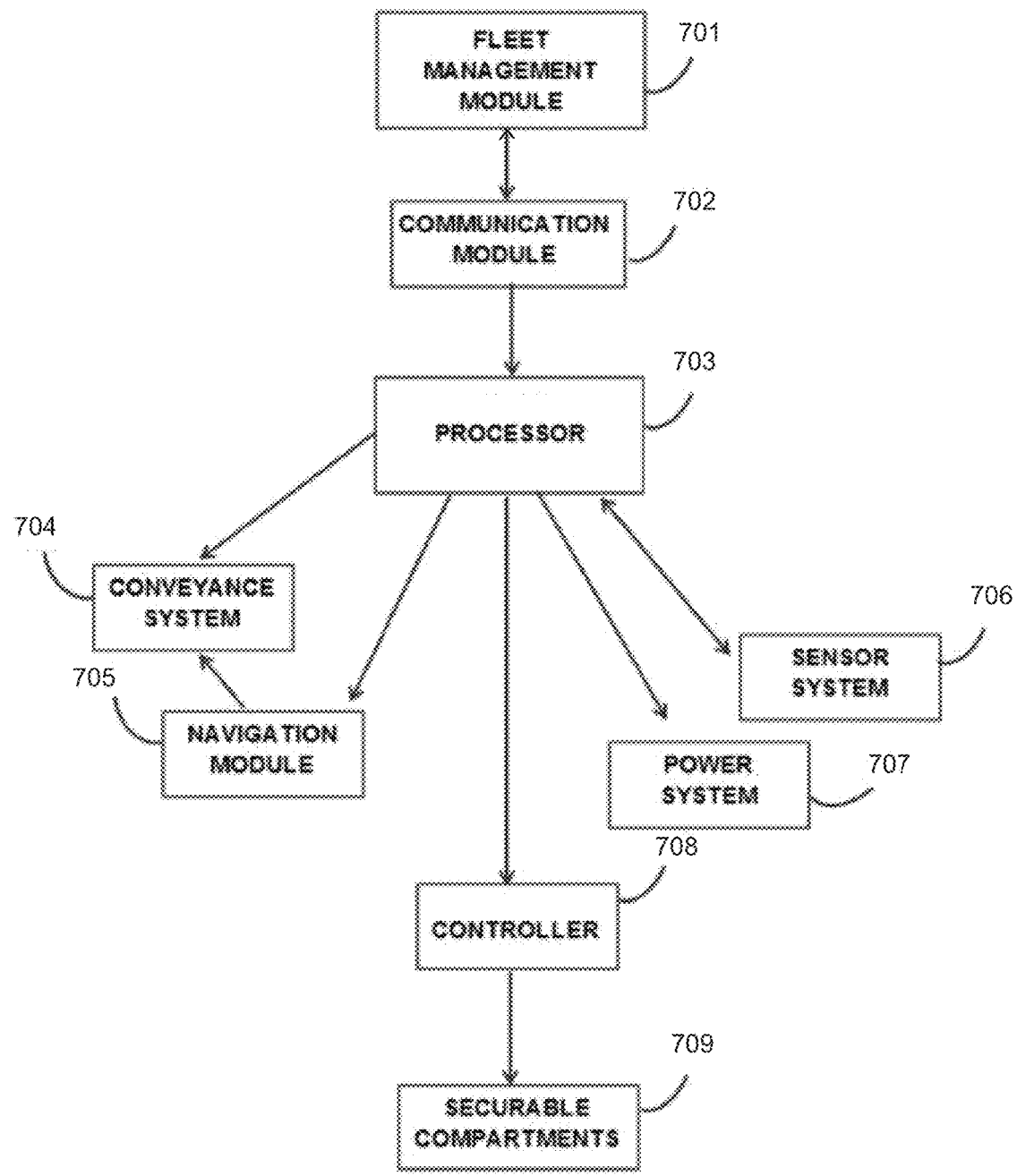
FIG. 7 is a flowchart of an exemplary autonomous vehicle application, in accordance with some embodiments.

Per FIG. 7, the fleet management module 701 instructs the processor 703 of the autonomous or semi-autonomous vehicle via a communication module 702. The processor 703 may be configured to send an instruction and receive a sensed data from the sensor system 706, and may further control at least one of the power system 707, the navigation module 705, and the conveyance system 704. The processor 703 may additionally be configured to instruct a controller 708 to open a securable compartment 709 to release any contents associated with an order.

In some embodiments, the processor 703 of the autonomous or semi-autonomous vehicle comprises at least one communication module 702 adapted to receive, store, and transmit data to and from a user and the fleet management module 701. In some embodiments, the data comprises a schedule, a request or order, a current location, a delivery location, a service provider location, a route, an estimated time of arrival (ETA), a repositioning instruction, a vehicle condition, a vehicle speed, or any combination thereof.

In some embodiments, the communication module 702 is configured to receive, store, and transmit data to and from a user via a user application. In some embodiments, the user application comprises a computer application, an internet application, a tablet application, a phone application, or any combination thereof. In some embodiments, the communication module 702 is configured to receive, store, and transmit data via wireless transmission (e.g., 4G, 5G, or satellite communications). In some embodiments, the wireless transmission occurs via: a central server, a fleet management module, a mesh network, or any combination thereof. In some embodiments, the user application is configured to send and receive data via an electronic device comprising a phone, a personal mobile device, a personal digital assistant (PDA), a mainframe computer, a desktop computer, a laptop computer, a tablet computer, and/or wearable computing device comprising: a communication headset, smart glasses, or a combination thereof.

In some embodiments, the navigation module 705 controls the conveyance system 704 to translate the autonomous or semi-autonomous vehicle through the unstructured open or closed environments. In some embodiments, the navigation module 705 comprises a digital map, a street view photograph, a GPS point, or any combination thereof. In some embodiments, the map is generated by a user, a customer, a service provider, a fleet operator, an online repository, a public database, or any combination thereof. In some embodiments, the map is generated only for intended operational geography. The maps may be augmented by data obtained by the sensor system 706. The navigation module 705 may further implement data collected by the sensor system 706 to determine the location and/or the surroundings of the autonomous or semi-autonomous vehicle. In some embodiments, the map further comprises a navigation marker comprising a lane, a road sign, an intersection, a grade, or any combination thereof.

In some embodiments, the fleet management module 701 is configured to determine and predict a geographic demand for the autonomous or semi-autonomous vehicles for strategic placement throughout a geographic region in anticipation of a known demand. The fleet management module 701 may determine and predict a geographic demand by storing data relating the location, quantity, time, price, item, item type, service, service type, service provider, or any combination thereof of placed orders and requests. Further, the service provider may provide independently measured trends to supplement or augment the measured trends. As such, the vehicles may be strategically placed to reduce transit and idle time and to increase sales volume and efficiency.

Operating Environments

In some embodiments, the unstructured open environment is a non-confined geographic region accessible by navigable pathways comprising: public roads, private roads, bike paths, open fields, open public lands, open private lands, pedestrian walkways, lakes, rivers, or streams.

In some embodiments, the closed environment is a confined, enclosed, or semi-enclosed structure accessible by navigable pathways comprising: a ground space within a commercial architecture, an airspace within a commercial architecture, an aisle, a hallway, a tunnel, a ramp, an elevator, a conveyor, or a pedestrian walkway. The closed environment may or may not comprise internal structures or obstacles.

In some embodiments, the unstructured open environment is a non-confined airspace or a near-space environment, within the Earth's atmosphere comprising the troposphere, the stratosphere, the mesosphere, the thermosphere and the exosphere.

Primary and Secondary Autonomous or Semi-Autonomous Vehicles

In some embodiments, the fleet of autonomous or semi-autonomous vehicles comprises a plurality of primary vehicles, and a plurality of secondary vehicles, wherein one or more of the secondary vehicles may be transported by or within the primary vehicle, and wherein the secondary vehicle is separable from the primary vehicle.

In some embodiments, the secondary autonomous or semi-autonomous vehicle comprises a land-based autonomous or semi-autonomous vehicle, an aerial drone, or a watercraft. In some embodiments, the secondary autonomous or semi-autonomous vehicles are configured to be at least one half the size of the primary autonomous or semi-autonomous vehicle. In some embodiments, the secondary vehicle is configured with the same traveling speeds and modes as the primary autonomous or semi-autonomous vehicle. Alternatively, the secondary autonomous or semi-autonomous vehicle may be configured with some, if not all, of the same capabilities of the primary autonomous or semi-autonomous vehicle.

In some embodiments, the secondary autonomous or semi-autonomous vehicle is configured to perform a secondary duty, such as: acquiring a soil/water/air sample; acquiring a close-up picture; accessing small or confined areas (e.g.: drainage pipes and small tunnels); transporting an item from a location of the autonomous or semi-autonomous vehicle to a door, drop box, or alternative secondary location; transporting an item inside of a building, or any combination thereof.

In some embodiments, the secondary autonomous or semi-autonomous vehicle is transported in a storage compartment, on the top, or on the back of the primary vehicle autonomous or semi-autonomous vehicle. In some embodiments, the secondary autonomous or semi-autonomous vehicle is tethered to the primary autonomous or semi-autonomous vehicle. In some embodiments, the secondary autonomous or semi-autonomous vehicle is configured for auto-self-extraction from the primary vehicle. In some embodiments, the primary vehicle comprises a ramp, a platform, a lift, or any combination thereof, to enable auto-self-extraction of the secondary autonomous or semi-autonomous vehicle.

Goods and Services

In some embodiments, the fleet of autonomous or semi-autonomous vehicles herein are configured to receive and deliver a product and to provide a service to a user. In some embodiments, the user comprises a fleet manager, a sub-contracting vendor, a service provider, a customer, a business entity, an individual, or a third-party. In some embodiments, the autonomous or semi-autonomous vehicle fleet user is a city, county, state, or federal road management agency. In some embodiments, the autonomous or semi-autonomous vehicle fleet user is a business entity utilizing the fleet to survey and report on large parcels of (indoor or outdoor) property. In some embodiments, the autonomous or semi-autonomous vehicle fleet is configurable for security monitoring.

In some embodiments, the autonomous or semi-autonomous vehicles in the fleet are configurable for monitoring and reporting weather and atmospheric conditions in any number of adverse environments. In some embodiments, the service comprises routine auditing of roads, construction sites, parking lots, etc. In some embodiments, the services comprise automated new generation of High Definition mapping information. In some embodiments, the services comprise real time updating of map information (number of lanes, location of lane boundaries, location of crosswalks, curbs, general road information useful for navigation). In some embodiments, the services may comprise routine, updating service on a schedule, such as multiple intervals per day, daily intervals, weekly intervals, monthly intervals, or annual intervals. In some embodiments, the services comprise updating of map information (number of lanes, location of lane boundaries, location of crosswalks, curbs, general road information useful for navigation), at a frequency to be determined by the services contract. In some embodiments, the frequency is about once per week, about once per month, about once per quarter year, about once per half year, about once per three quarters of a year, about once per year, about once per 18 months, about once per two years, about once per three years, about once per four years, or about once per five years. In some embodiments, the services comprise land/site (topographic) surveys. In some embodiments, the services comprise disaster area surveys and assessments. In some embodiments, the services comprise road condition surveys. In some embodiments, the services comprise traffic surveys. In some embodiments, the services comprise traffic signal and signage surveys. In some embodiments, the services comprise architectural building or road infrastructure (bridge condition) surveys. In some embodiments, the services comprise advertising services.

Controllers and Processors

In some embodiments, each autonomous or semi-autonomous vehicle in the autonomous or semi-autonomous vehicle fleet is equipped with at least one processor configured with both a high-level computing capacity for processing, and a low-level safety critical computing capacity for controlling the hardware. The at least one processor is configured to manage the conveyance system, manage the power system, manage the navigation module, manage the various aspects of the sensor system, process and manage the instructions from the fleet management module, and manage the at least one communication module.

In some embodiments, each autonomous or semi-autonomous vehicle in the autonomous or semi-autonomous vehicle fleet is equipped with a software module, executed by the at least one processor to apply one or more algorithms to data collected from the plurality of sensors to identify, document, and store to a memory device, one or more of: road and pathway conditions; (damaged roads, pot holes); road and pathway information, such as: number of lanes, location of boundaries, location of curbs, location of road edge, location of crosswalks, etc.; traffic speed; traffic congestion; weather conditions; parking violations; public utility issues; street light issues; traffic light issues; pedestrian density/traffic; animals; alternative vehicular traffic. (e.g., motorcycles, mopeds, bicycles, wheelchairs, strollers); area surveillance; waterway conditions; bridge inspection; internal and external structural inspection; various types of site inspections; land survey results; and foliage inspection. Additionally, the data collected from the plurality of sensors may include the current state of street lights and traffic lights which also includes the color the traffic light (to accumulate real-time data of which lights are green, etc.) and confirmation of when street lights are on.

In some embodiments, data stored to a memory device is uploadable either wirelessly to the fleet manager or via wireless or wired downloading when the autonomous or semi-autonomous vehicle returns to a fleet terminal. Once uploaded wirelessly or downloaded via wireless or wired downloading to the fleet manager, the data may then be processed appropriately.

In some embodiments, data stored to a memory device is uploadable to a local or central server that is distinct from the fleet manager (e.g., an autonomous or semi-autonomous vehicle comes back to base, uploads its data to a processing server, the processing server processes the data, and then the resulting processed data is provided directly to customers or businesses or the fleet of autonomous or semi-autonomous vehicles, etc).

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 8:
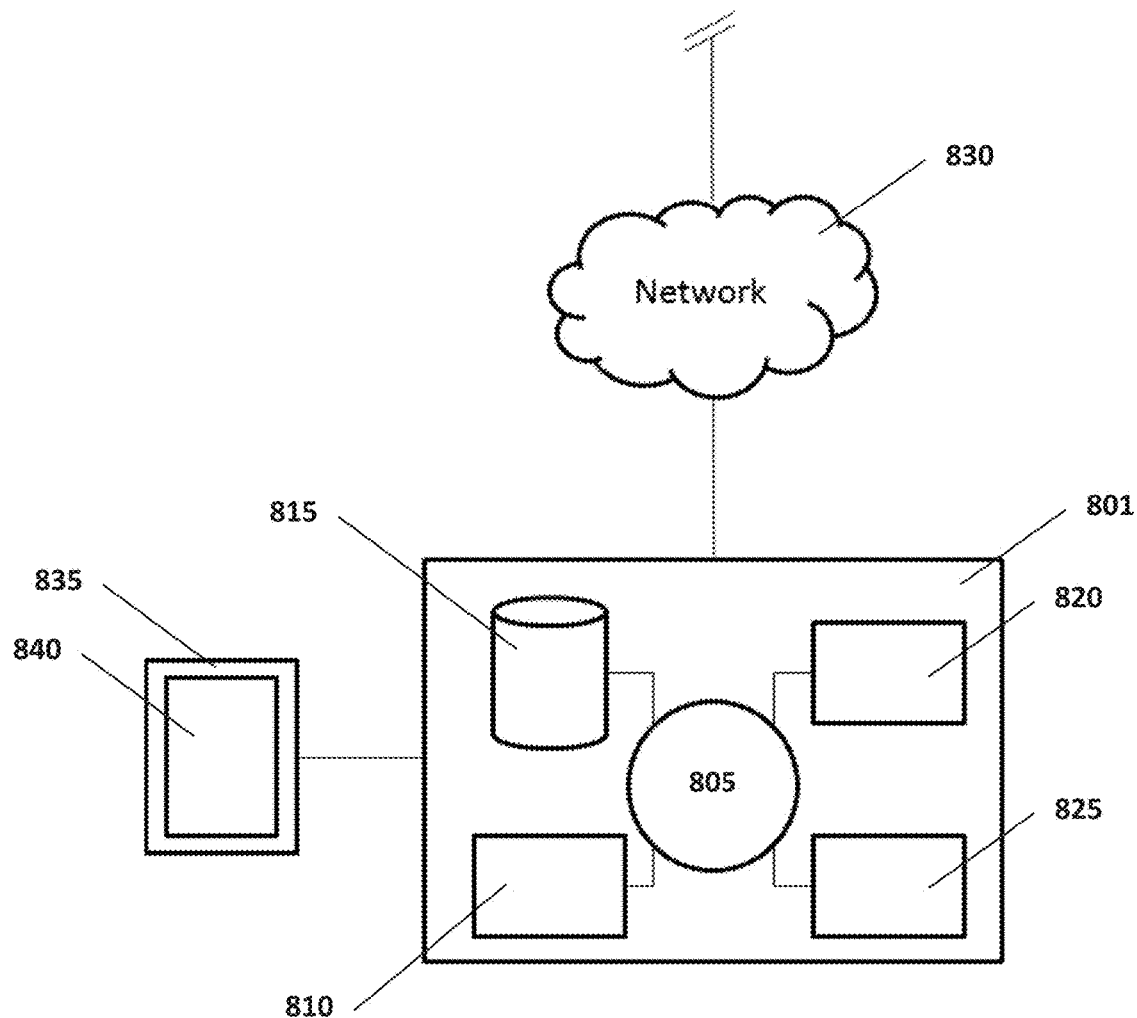
FIG. 8 shows a non-limiting schematic diagram of a digital processing device; in this case, a device with one or more CPUs, a memory, a communication interface, and a display.

Referring to FIG. 8, in a particular embodiment, a digital processing device 801 is programmed or otherwise configured to managing autonomous or semi-autonomous vehicles. The device 801 is programmed or otherwise configured to manage autonomous or semi-autonomous vehicles. In this embodiment, the digital processing device 801 includes a central processing unit (CPU, also "processor" and "computer processor" herein) 805, which is optionally a single core, a multi core processor, or a plurality of processors for parallel processing. The digital processing device 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 comprises a data storage unit (or data repository) for storing data. The digital processing device 801 is optionally operatively coupled to a computer network ("network") 830 with the aid of the communication interface 820. The network 830, in various cases, is the internet, an internet, and/or extranet, or an intranet and/or extranet that is in communication with the internet. The network 830, in some cases, is a telecommunication and/or data network. The network 830 optionally includes one or more computer servers, which enable distributed computing, such as cloud computing. The network 830, in some cases, with the aid of the device 801, implements a peer-to-peer network, which enables devices coupled to the device 801 to behave as a client or a server.

Continuing to refer to FIG. 8, the CPU 805 is configured to execute a sequence of machine-readable instructions, embodied in a program, application, and/or software. The instructions are optionally stored in a memory location, such as the memory 810. The instructions are directed to the CPU 805, which subsequently program or otherwise configure the CPU 805 to implement methods of the present disclosure. Examples of operations performed by the CPU 805 include fetch, decode, execute, and write back. The CPU 805 is, in some cases, part of a circuit, such as an integrated circuit. One or more other components of the device 801 are optionally included in the circuit. In some cases, the circuit is an application specific integrated circuit (ASIC) or a field programmable gate array (FPGA).

Continuing to refer to FIG. 8, the storage unit 815 optionally stores files, such as drivers, libraries, and saved programs. The storage unit 815 optionally stores user data, e.g., user preferences and user programs. The digital processing device 801, in some cases, includes one or more additional data storage units that are external, such as located on a remote server that is in communication through an intranet or the internet.

Continuing to refer to FIG. 8, the digital processing device 801 optionally communicates with one or more remote computer systems through the network 830. For instance, the device 801 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 604 (FIG. 6), such as, for example, on the memory 810 or electronic storage unit 815. The machine executable or machine readable code is optionally provided in the form of software. During use, the code is executed by the processor 805. In some cases, the code is retrieved from the storage unit 815 and stored on the memory 810 for ready access by the processor 805. In some situations, the electronic storage unit 815 is precluded, and machine-executable instructions are stored on the memory 810.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Programs

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Applications

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 9:
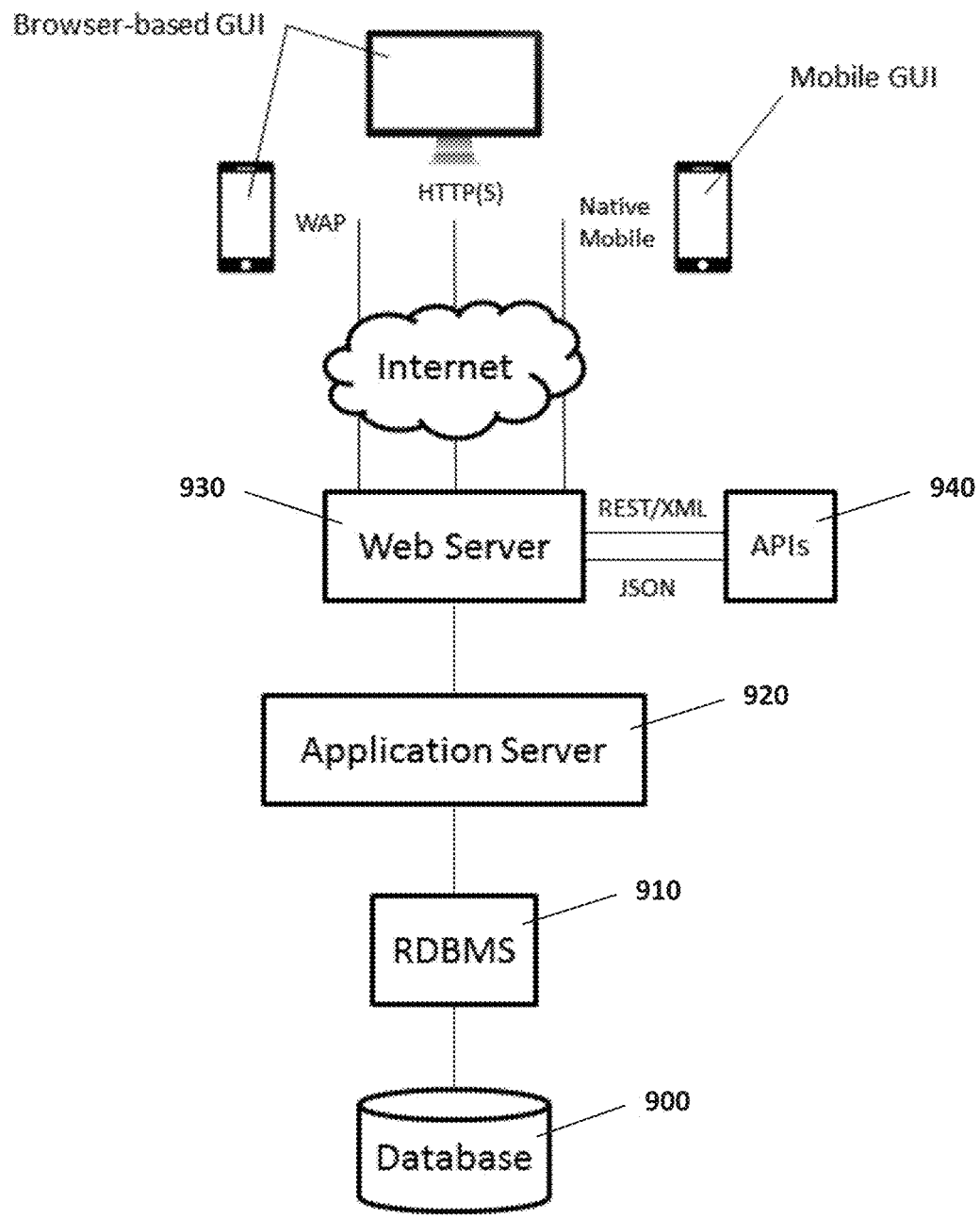
FIG. 9 shows a non-limiting schematic diagram of a web/mobile application provision system; in this case, a system providing browser-based and/or native mobile user interfaces.

Referring to FIG. 9, in a particular embodiment, an application provision system comprises one or more databases 900 accessed by a relational database management system (RDBMS) 910. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 920 (such as Java servers, .NET servers, PHP servers, and the like) and one or more web servers 930 (such as Apache, IIS, GWS and the like). The web server(s) optionally expose one or more web services via app application programming interfaces (APIs) 940. Via a network, such as the internet, the system provides browser-based and/or mobile native user interfaces.

Figure 10:
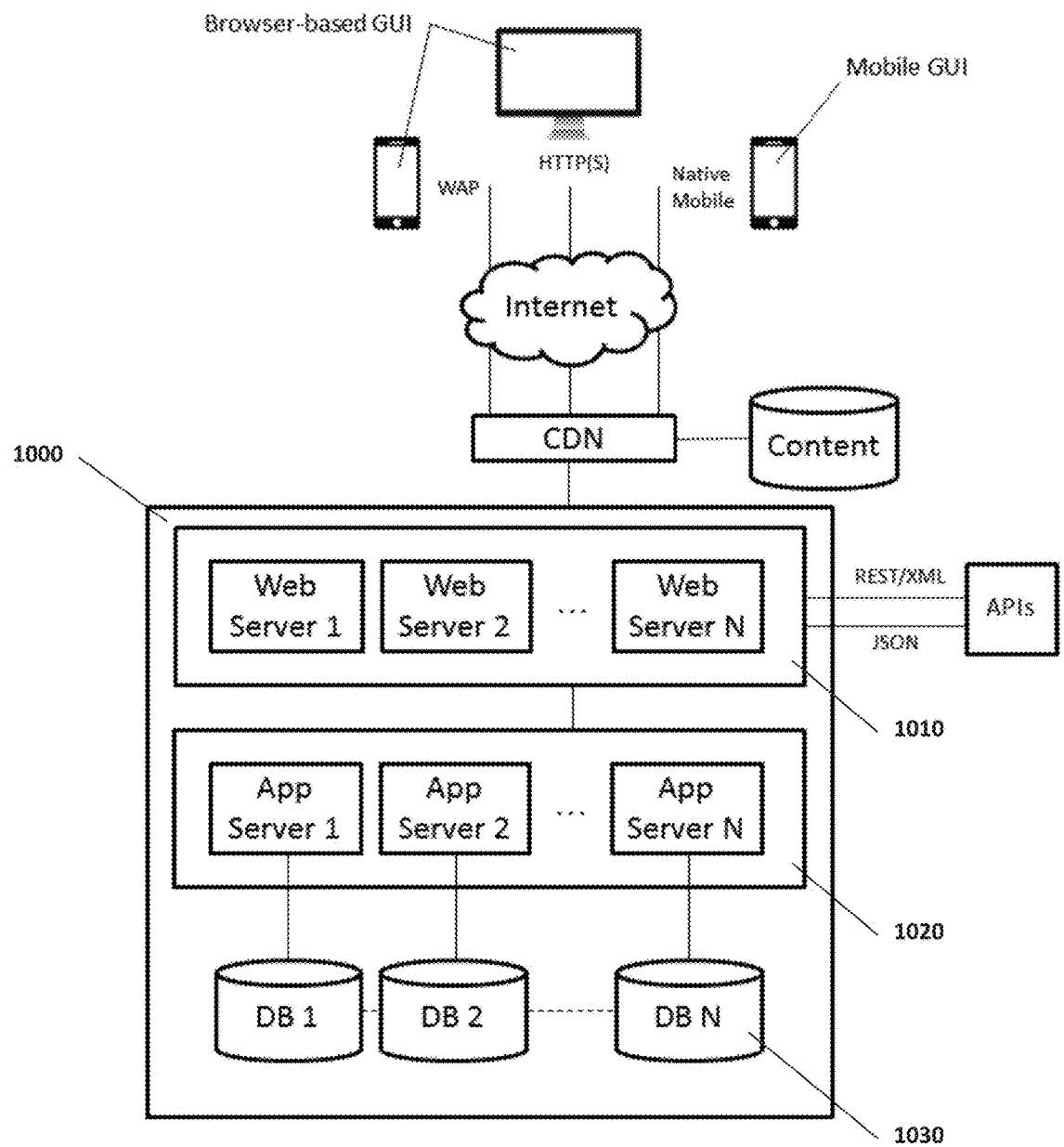
FIG. 10 shows a non-limiting schematic diagram of a cloud-based web/mobile application provision system; in this case, a system comprising an elastically load balanced, auto-scaling web server and application server resources as well synchronously replicated databases.

Referring to FIG. 10, in a particular embodiment, an application provision system alternatively has a distributed, cloud-based architecture 1000 and comprises elastically load balanced, auto-scaling web server resources 1010, and application server resources 1020 as well synchronously replicated databases 1030.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Platform for Distributing and Navigating an Autonomous or Semi-Autonomous Fleet

Figure 11:
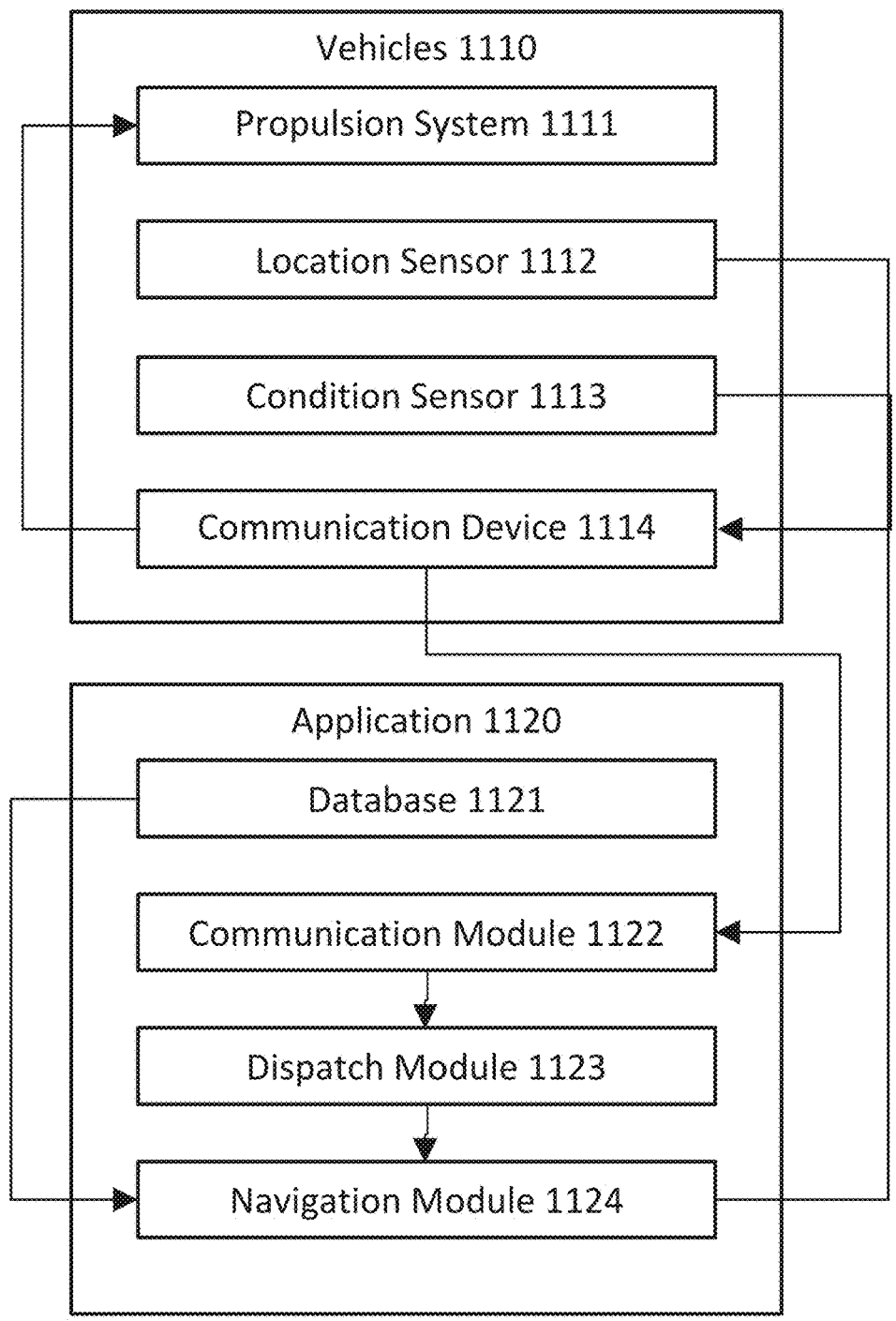
FIG. 11 shows a non-limiting schematic diagram of a platform for determining a real-time parking status for a plurality of parking locations.

Provided herein, per FIG. 11, is a platform for distributing and navigating an autonomous or semi-autonomous fleet throughout a plurality of pathways, the platform comprising the fleet and a server processor configured to provide a server application 1120.

The fleet may comprise a plurality of autonomous or semi-autonomous vehicles 1110. Each autonomous or semi-autonomous vehicle 1110 may comprise an autonomous or semi-autonomous propulsion system 1111, a location sensor 1112, a condition sensor 1113, and a communication device 1114.

The location sensor 1112 may be configured to measure a current vehicle location of the vehicle 1110. The current vehicle location may comprise a street address, a GPS coordinate, a proximity to a set location, or any combination thereof. The location sensor 1112 may comprise a camera, a video camera, a LiDAR, a RADAR, a microphone, a GPS sensor, or any combination thereof. The condition sensor 1113 may be configured to measure a current vehicle status. The communication device 1114 may be configured to transmit the current vehicle location and the current vehicle status. In some embodiments, the current vehicle status comprises a vehicle power level, a vehicle stock, a vehicle hardware status, or any combination thereof.

The server application 1120 may comprise a database 1112, a communication module 1122, a dispatch module 1123, and a navigation module 1124. The database 1112 may comprise a map of the plurality of pathways. The map may comprise a plurality of GPS points, a plurality of addresses, a plurality of streets, a plurality of locations of interest, or any combination thereof. The pathway may comprise a roadway, a highway, a freeway, a sidewalk, a walkway, a bridge, a tunnel, a trail, a pedestrian zone, a marketplace, a courtyard, or any combination thereof. Each pathway may be associated with a pathway parameter. The pathway parameter may comprise a autonomous driving safety factor and a speed factor. In some embodiments, at least one of the speed factor and the autonomous vehicle safety parameter comprises a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof.

In some embodiments, the autonomous driving safety factor comprises, a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof.

The communication module 1122 may receive the current vehicle location and the current vehicle status. The communication module 1122 may receive the current vehicle location and the current vehicle status from the communication device 1114.

The dispatch module 1123 may assign one or more of the plurality of autonomous or semi-autonomous vehicles 1110 to the task destination. The task destination may comprise a GPS point, an address, a street, or any combination thereof. The task destination may be an order delivery address associated with a customer, an order, or both. The task destination may be an order pick up address associated with a vendor, a service provider, the order, or both. The vehicle 1110 may pick up an item from the customer at the task location, drop off an item at the task location, or both. The dispatch module 1123 may assign one or more of the plurality of autonomous or semi-autonomous vehicles 1110 to the task destination based at least on the current vehicle location and the current vehicle status. The dispatch module 1123 may assign the vehicle 1110 whose current location is the shortest point to point distance from the task destination, shortest driving distance from the task destination, shortest driving time from the driving distance, or any weighted combination thereof. The dispatch module 1123 may assign the vehicle 1110 with a current vehicle status comprising the highest stored propulsion energy. The dispatch module 1123 may assign the vehicle 1110 with a current vehicle status comprising the lowest power level. The dispatch module 1123 may assign the vehicle 1110 with a current vehicle status comprising the highest power level. The dispatch module 1123 may assign the vehicle 1110 with a vehicle hardware status clear of any issues. The dispatch module 1123 may assign the vehicle 1110 with the vehicle 1110 stock associated with an order.

The navigation module 1124 may apply a route calculation algorithm to determine a vehicle task route from the current vehicle location to the task destination. The navigation module 1124 may apply a route calculation algorithm to determine a vehicle task route from the current vehicle location to the task destination based at least on the pathway parameter and the current vehicle status. The navigation module 1124 may apply a route calculation algorithm to determine a vehicle task route from the current vehicle location to the task destination to maximize the autonomous driving safety factor, the speed factor, or both. In some embodiments, the route calculation algorithm comprises a machine learning algorithm, a rule-based algorithm, or both. The vehicle task route may comprise at least a portion of one of the plurality of pathways.

In some embodiments, the autonomous driving safety factor is associated with an autonomous driving task. In some embodiments, the autonomous driving safety factor comprises a semi-autonomous driving safety factor. In some embodiments, the autonomous driving safety factor comprises an unmanned driving safety factor. In some embodiments, the autonomous driving safety factor is unique to autonomous driving, semi-autonomous driving, unmanned driving, or any combination thereof. Each autonomous driving safety factor may be associated with a set autonomous driving safety factor weight, wherein the weight is based on a severity, a risk, or both of the autonomous driving safety factor. In some embodiments, the autonomous driving safety factor weight is unique to autonomous driving, semi-autonomous driving, unmanned driving, or any combination thereof.

For example, the route calculation algorithm may select or prioritize a route along only residential streets as opposed to a route having a turn type comprising a left turn on a two way road without a dedicated left turn signal as such turns may be more difficult to maneuver autonomously. In another example, the autonomous driving safety factor weight is significant for roadways associated with sports venues, school zones, bars or any other establishments that serve alcohol, accident events or incidences, stopped traffic events or incidences, and other areas with less predictable pedestrian behavior that pose challenges unique to unmanned vehicles, wherein such challenges are easily addressed by a human driver. The route calculation algorithm may select or prioritize a route that is safer but longer in distance or travel time over a route that is less safe but more direct. The route calculation algorithm may select or prioritize a route that is currently or has previously been employed by other autonomous or semi-autonomous vehicles. In some embodiments, the autonomous driving safety factor may be time dependent. Multiple lanes or positions within the roadway may be associated with different autonomous driving safety factors based on, for example, lighting, debris, or other associated risks or advantages. The autonomous driving safety factors may be configured to compound the autonomous driving safety factor weights greater than the sum of their parts. For example, a roadway having a high road slope and a high iciness parameter may be associated with an autonomous driving safety factor greater than the sum of the weights associated with each, as both a steep and icy road is particularly more hazardous to an unmanned vehicle.

In some embodiments, an autonomous driving safety factor may be different than the speed factor, whereby some conditions that increase the speed factor do not increase or decrease the autonomous driving safety factor. The speed factor and the an autonomous driving safety factor may be considered separately. The speed factor and the an autonomous driving safety factor may be considered in combination, or influence one another. Some autonomous driving safety factors may also comprise speed factors. For example, a high average speed on a roadway may allow for faster transit and lower transit time. However, a high average speed may impart additional safety risks associated with bandwidth and operational calculations required for operation at such speeds.

The communication device 1114 may further direct the autonomous or semi-autonomous propulsion system 1111 of the autonomous or semi-autonomous vehicle. The communication device 1114 may further direct the autonomous or semi-autonomous propulsion system 1111 of the assigned autonomous or semi-autonomous vehicle based on the vehicle task route.

In some embodiments, the autonomous or semi-autonomous vehicle 1110 further comprises a sensor configured to measure a sensed data. In some embodiments, the database 1112 further stores at least one of the current vehicle location, the current vehicle status, and the sensed data. In some embodiments, the pathway parameter is based at least on the sensed data. In some embodiments, at least one of the safety factor and the speed factor are based on the sensed data. In some embodiments, the sensed data enables crowd sourced safety factor and speed factor determination. In some embodiments, the application 1120 further comprises a pathway parameter prediction module predicting a future pathway parameter based at least on the sensed data. In some embodiments, the route calculation algorithm further determines the vehicle 1110 task route based on the predicted road parameter. In some embodiments, the autonomous or semi-autonomous vehicle 1110 further comprises a sensor configured to measure a sensed data. The sensed data may comprise a picture, a video, a three-dimensional image, a sound, a light value, a tactile value, a chemical data, or any combination thereof.

In some embodiments, the server application further comprises a display module displaying at least one of the current vehicle location, the current vehicle status and the task destination.

Figure 12:
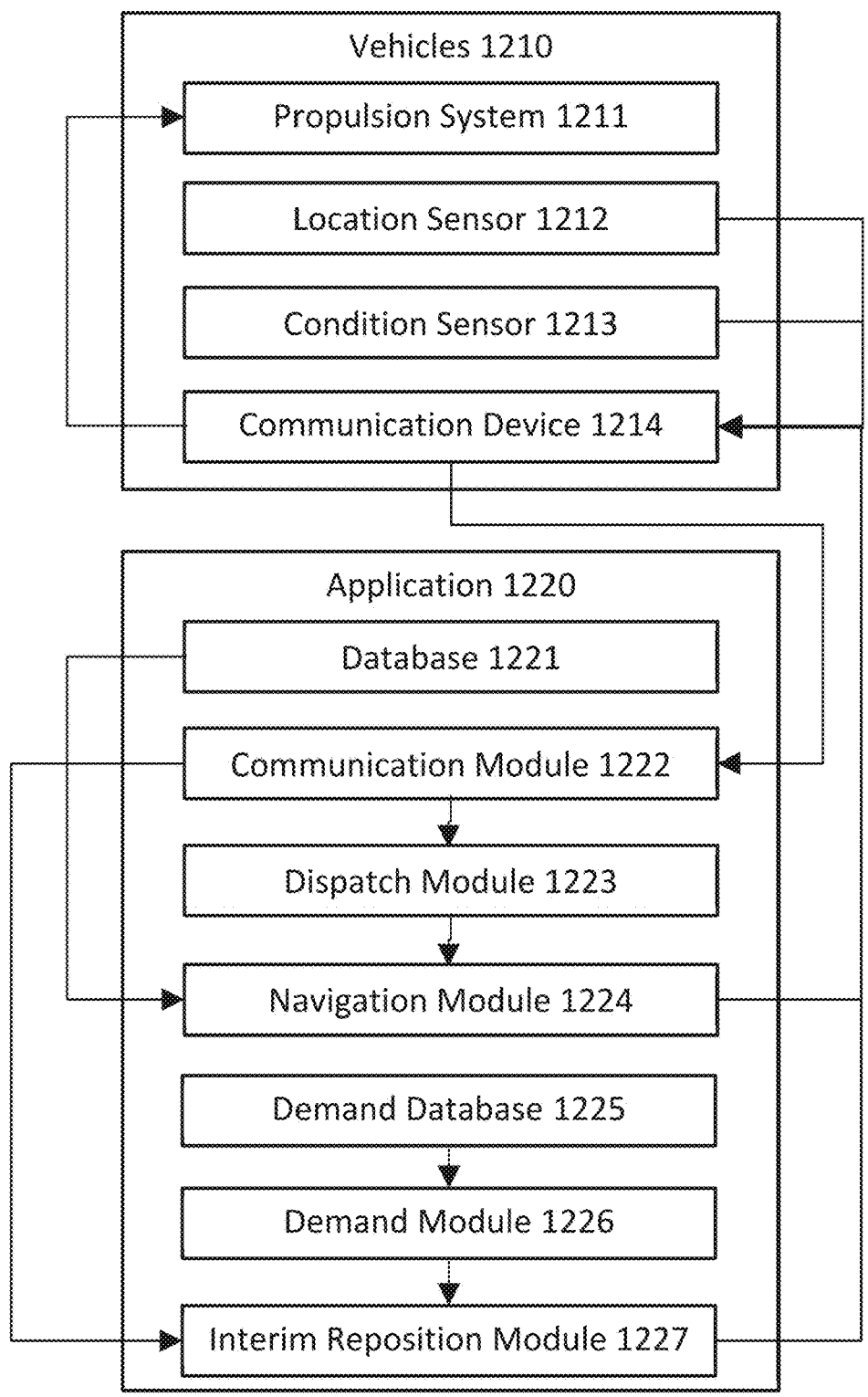
FIG. 12 shows another non-limiting schematic diagram of a platform for determining a real-time parking status for a plurality of parking locations.

Provided herein, per FIG. 12, is a platform for distributing and navigating an autonomous or semi-autonomous fleet throughout a plurality of pathways, the platform comprising the fleet and a server processor configured to provide a server application 1220.

The fleet may comprise a plurality of autonomous or semi-autonomous vehicles 1210. Each autonomous or semi-autonomous vehicle 1210 may comprise an autonomous or semi-autonomous propulsion system 1211, a location sensor 1212, a condition sensor 1213, and a communication device 1214.

The location sensor 1212 may be configured to measure a current vehicle location of the vehicle 1210. The current vehicle location may comprise a street address, a GPS coordinate, a proximity to a set location, or any combination thereof. The location sensor 1212 may comprise a camera, a video camera, a LiDAR, a RADAR, a microphone, a GPS sensor, or any combination thereof. The condition sensor 1213 may be configured to measure a current vehicle status. The communication device 1214 may be configured to transmit the current vehicle location and the current vehicle status. In some embodiments, the current vehicle status comprises a vehicle power level, a vehicle stock, a vehicle hardware status, or any combination thereof.

The server application 1220 may comprise a database 1221, a communication module 1222, a dispatch module 1223, and a navigation module 1224. The database 1221 may comprise a map of the plurality of pathways. The map may comprise a plurality of GPS points, a plurality of addresses, a plurality of streets, a plurality of locations of interest, or any combination thereof. The pathway may comprise a roadway, a highway, a freeway, a sidewalk, a walkway, a bridge, a tunnel, a trail, a pedestrian zone, a marketplace, a courtyard, or any combination thereof. Each pathway may be associated with a pathway parameter. The pathway parameter may comprise a autonomous driving safety factor and a speed factor. In some embodiments, the speed factor comprises, a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof. In some embodiments, the autonomous driving safety factor comprises, a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof The communication module 1222 may receive the current vehicle location and the current vehicle status. The communication module 1222 may receive the current vehicle location and the current vehicle status from the communication device 1214.

The dispatch module 1223 may assign one or more of the plurality of autonomous or semi-autonomous vehicles 1210 to the task destination. The task destination may comprise a GPS point, an address, a street, or any combination thereof. The task destination may be an order delivery address associated with a customer, an order, or both. The task destination may be an order pick up address associated with a vendor, a service provider, the order, or both. The vehicle 1210 may pick up an item from the customer at the task location, drop off an item at the task location, or both. The dispatch module 1223 may assign one or more of the plurality of autonomous or semi-autonomous vehicles 1210 to the task destination based at least on the current vehicle location and the current vehicle status. The dispatch module 1223 may assign the vehicle 1210 whose current location is the shortest point to point distance from the task destination, shortest driving distance from the task destination, shortest driving time from the driving distance, or any weighted combination thereof. The dispatch module 1223 may assign the vehicle 1210 with a current vehicle status comprising the highest stored propulsion energy. The dispatch module 1223 may assign the vehicle 1210 with a current vehicle status comprising the lowest power level. The dispatch module 1223 may assign the vehicle 1210 with a current vehicle status comprising the highest power level. The dispatch module 1223 may assign the vehicle 1210 with a vehicle hardware status clear of any issues. The dispatch module 1223 may assign the vehicle 1210 with the vehicle 1210 stock associated with an order.

The navigation module 1224 may apply a route calculation algorithm to determine a vehicle task route from the current vehicle location to the task destination. The navigation module 1224 may apply a route calculation algorithm to determine a vehicle task route from the current vehicle location to the task destination based at least on the pathway parameter and the current vehicle status. The navigation module 1224 may apply a route calculation algorithm to determine a vehicle task route from the current vehicle location to the task destination to maximize the autonomous driving safety factor, the speed factor, or both. In some embodiments, the route calculation algorithm comprises a machine learning algorithm, a rule-based algorithm, or both. The vehicle task route may comprise at least a portion of one of the plurality of pathways. The communication device 1214 may further direct the autonomous or semi-autonomous propulsion system 1211 of the autonomous or semi-autonomous vehicle. The communication device 1214 may further direct the autonomous or semi-autonomous propulsion system 1211 of the assigned autonomous or semi-autonomous vehicle based on the vehicle task route.

In some embodiments, the server application 1220 further comprises a demand database 1225. The demand database 1225 may comprise a historical demand data associated with a geographic area. The geographic area may comprise at least the task destination.

In some embodiments, the server application 1220 further comprises a demand forecasting module 1226. The demand forecasting module 1226 may apply a prediction algorithm to determine a predicted demand schedule for each of the autonomous or semi-autonomous vehicles 1210. The demand forecasting module 1226 may apply a prediction algorithm to determine a predicted demand schedule for each of the autonomous or semi-autonomous vehicles 1210 based at least on the historical demand data. In some embodiments, prediction algorithm comprises a machine learning algorithm, a rule-based algorithm, or both. The predicted demand schedule may comprise a predicted demand task location within the geographic area, a predicted demand period, or both. The predicted demand task location may comprise a GPS point, an address, a location of interest, or any combination thereof. The predicted demand period may comprise a peak demand time, a plurality of ranked peak demand times, a peak demand time period, a plurality of ranked demand time periods, or any combination thereof.

In some embodiments, the server application 1220 further comprises an interim repositioning module 1227. The interim repositioning module 1227 may assign an interim repositioning mode to each of the plurality of autonomous or semi-autonomous vehicles 1210. The interim repositioning module 1227 may assign an interim repositioning mode to each of the plurality of autonomous or semi-autonomous vehicles 1210 based at least on one or more of the predicted demand task location, the predicted demand period, the task destination, and the current vehicle status. In some embodiments, the interim repositioning mode comprises a depot mode corresponding to a depot location, a parking mode associated with one of a plurality of parking spot locations, and a hover mode associated with a set threshold hover distance from the task destination or the predicted demand task location. In some embodiments, the database 1221 further comprises the plurality of parking spot locations within the geographic area.

In some embodiments, the navigation module 1224 further applies the route calculation algorithm to determine a vehicle repositioning route from the task destination: to the depot location, based on the depot mode; to a parking spot location, based on the parking mode; or to a vehicle hover route based on the hover mode. In some embodiments, the navigation module 1224 further applies the route calculation algorithm to determine a vehicle repositioning route from the task destination to the depot location, based on the depot mode. In some embodiments, the navigation module 1224 further applies the route calculation algorithm to determine a vehicle repositioning route from the task destination to a parking spot location, based on the parking mode. In some embodiments, the navigation module 1224 further applies the route calculation algorithm to determine a vehicle repositioning route from the task destination to a vehicle hover route based on the hover mode.

In some embodiments, the vehicle hover route comprises at least a portion of one of the plurality of pathways within the set threshold hover distance from the task destination or the predicted demand task location. In some embodiments, the communication device 1214 further directs the autonomous or semi-autonomous propulsion system 1211 of the autonomous or semi-autonomous vehicle 1210 to remain at the depot location, a parking spot location, or within the vehicle 1210 hover route for the predicted demand period. In some embodiments, the communication device 1214 further directs the autonomous or semi-autonomous propulsion system 1211 of the autonomous or semi-autonomous vehicle 1210 to remain at the depot location for the predicted demand period. In some embodiments, the communication device 1214 further directs the autonomous or semi-autonomous propulsion system 1211 of the autonomous or semi-autonomous vehicle 1210 to remain at a parking spot location for the predicted demand period. In some embodiments, the communication device 1214 further directs the autonomous or semi-autonomous propulsion system 1211 of the autonomous or semi-autonomous vehicle 1210 to remain within the vehicle hover route for the predicted demand period.

In some embodiments, the autonomous or semi-autonomous vehicle 1210 further comprises a sensor configured to measure a sensed data. In some embodiments, the database 1221 further stores at least one of the current vehicle location, the current vehicle status, and the sensed data. In some embodiments, the pathway parameter is based at least on the sensed data. In some embodiments, at least one of the safety factor and the speed factor are based on the sensed data. In some embodiments, the sensed data enables crowd sourced safety factor and speed factor determination.

In some embodiments, the application 1220 further comprises a pathway parameter prediction module predicting a future pathway parameter based at least on the sensed data. In some embodiments, the route calculation algorithm further determines the vehicle 1210 task route based on the predicted road parameter. In some embodiments, the autonomous or semi-autonomous vehicle 1210 further comprises a sensor configured to measure a sensed data.

In some embodiments, the server application further comprises a display module displaying at least one of the current vehicle location, the current vehicle status, the task destination, the pathway parameter, the task route, the parking spot location, and the predicted demand task location.

Figure 13:
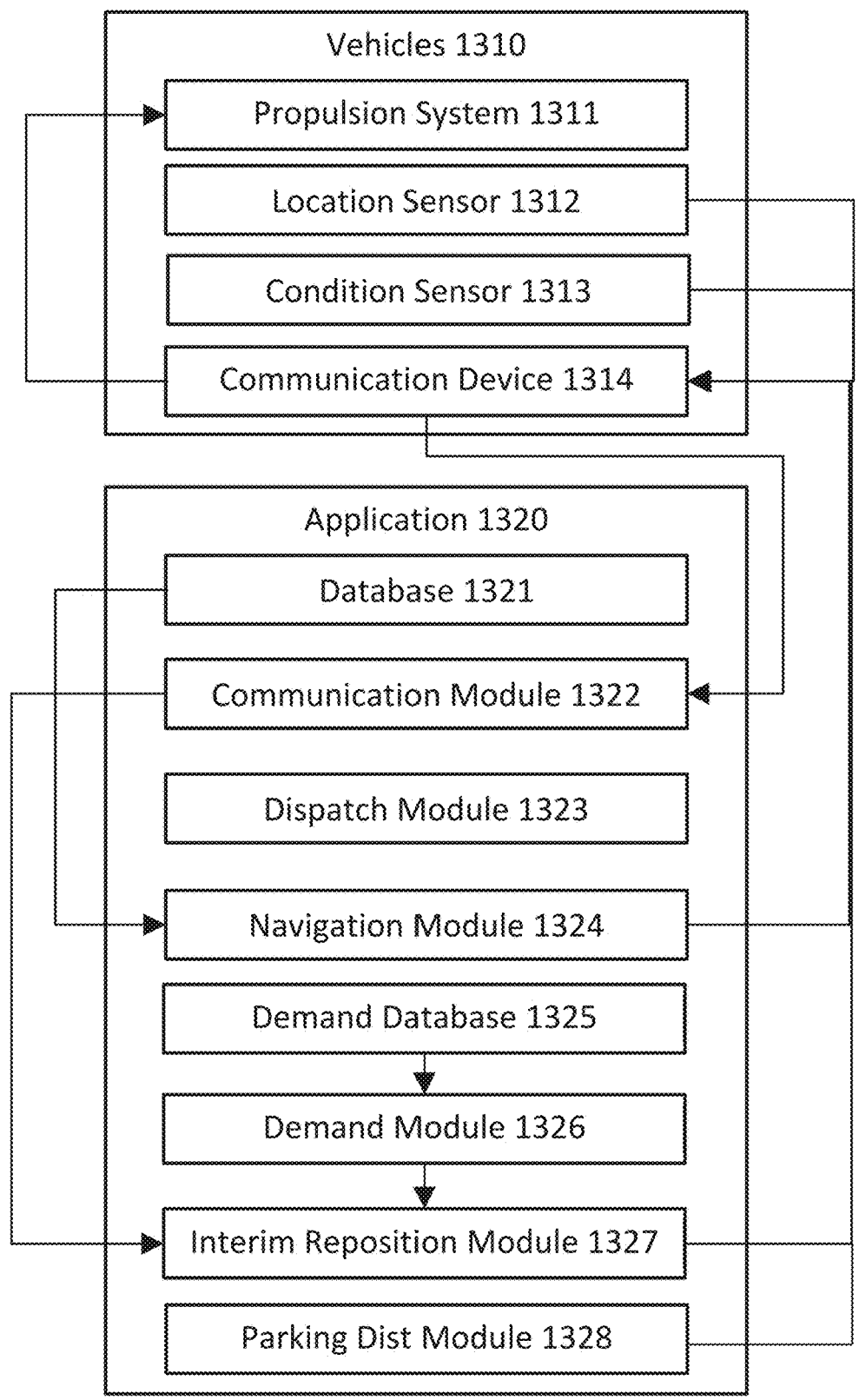
FIG. 13 shows another non-limiting schematic diagram of a platform for determining a real-time parking status for a plurality of parking locations.

Provided herein, per FIG. 13, is a platform for distributing and navigating an autonomous or semi-autonomous fleet throughout a plurality of pathways, the platform comprising the fleet and a server processor configured to provide a server application 1320.

The fleet may comprise a plurality of autonomous or semi-autonomous vehicles 1310. Each autonomous or semi-autonomous vehicle 1310 may comprise an autonomous or semi-autonomous propulsion system 1311, a location sensor 1312, a condition sensor 1313, and a communication device 1314.

The location sensor 1312 may be configured to measure a current vehicle location of the vehicle 1310. The current vehicle location may comprise a street address, a GPS coordinate, a proximity to a set location, or any combination thereof. The location sensor 1312 may comprise a camera, a video camera, a LiDAR, a RADAR, a microphone, a GPS sensor, or any combination thereof. The condition sensor 1313 may be configured to measure a current vehicle status. The communication device 1314 may be configured to transmit the current vehicle location and the current vehicle status. In some embodiments, the current vehicle status comprises a vehicle power level, a vehicle stock, a vehicle hardware status, or any combination thereof.

The server application 1320 may comprise a database 1321, a communication module 1322, a dispatch module 1323, and a navigation module 1324. The database 1321 may comprise a map of the plurality of pathways. The map may comprise a plurality of GPS points, a plurality of addresses, a plurality of streets, a plurality of locations of interest, or any combination thereof. The pathway may comprise a roadway, a highway, a freeway, a sidewalk, a walkway, a bridge, a tunnel, a trail, a pedestrian zone, a marketplace, a courtyard, or any combination thereof. Each pathway may be associated with a pathway parameter. The pathway parameter may comprise an autonomous driving safety factor and a speed factor. In some embodiments, the speed factor comprises, a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof. In some embodiments, the autonomous driving safety factor comprises, a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof The communication module 1322 may receive the current vehicle location and the current vehicle status. The communication module 1322 may receive the current vehicle location and the current vehicle status from the communication device 1314.

The dispatch module 1323 may assign one or more of the plurality of autonomous or semi-autonomous vehicles 1310 to the task destination. The task destination may comprise a GPS point, an address, a street, or any combination thereof. The task destination may be an order delivery address associated with a customer, an order, or both. The task destination may be an order pick up address associated with a vendor, a service provider, the order, or both. The vehicle 1310 may pick up an item from the customer at the task location, drop off an item at the task location, or both. The dispatch module 1323 may assign one or more of the plurality of autonomous or semi-autonomous vehicles 1310 to the task destination based at least on the current vehicle location and the current vehicle status. The dispatch module 1323 may assign the vehicle 1310 whose current location is the shortest point to point distance from the task destination, shortest driving distance from the task destination, shortest driving time from the driving distance, or any weighted combination thereof. The dispatch module 1323 may assign the vehicle 1310 with a current vehicle status comprising the highest stored propulsion energy. The dispatch module 1323 may assign the vehicle 1310 with a current vehicle status comprising the lowest power level. The dispatch module 1323 may assign the vehicle 1310 with a current vehicle status comprising the highest power level. The dispatch module 1323 may assign the vehicle 1310 with a vehicle hardware status clear of any issues. The dispatch module 1323 may assign the vehicle 1310 with the vehicle 1310 stock associated with an order.

The navigation module 1324 may apply a route calculation algorithm to determine a vehicle task route from the current vehicle location to the task destination. The navigation module 1324 may apply a route calculation algorithm to determine a vehicle task route from the current vehicle location to the task destination based at least on the pathway parameter and the current vehicle status. The navigation module 1324 may apply a route calculation algorithm to determine a vehicle task route from the current vehicle location to the task destination to maximize the autonomous driving safety factor, the speed factor, or both. In some embodiments, the route calculation algorithm comprises a machine learning algorithm, a rule-based algorithm, or both. The vehicle task route may comprise at least a portion of one of the plurality of pathways. The communication device 1314 may further direct the autonomous or semi-autonomous propulsion system 1311 of the autonomous or semi-autonomous vehicle. The communication device 1314 may further direct the autonomous or semi-autonomous propulsion system 1311 of the assigned autonomous or semi-autonomous vehicle based on the vehicle task route.

In some embodiments, the server application 1320 further comprises a demand database 1325. The demand database 1325 may comprise a historical demand data associated with a geographic area. The geographic area may comprise at least the task destination.

In some embodiments, the server application 1320 further comprises a demand forecasting module 1326. The demand forecasting module 1326 may apply a prediction algorithm to determine a predicted demand schedule for each of the autonomous or semi-autonomous vehicles 1310. The demand forecasting module 1326 may apply a prediction algorithm to determine a predicted demand schedule for each of the autonomous or semi-autonomous vehicles 1310 based at least on the historical demand data. In some embodiments, prediction algorithm comprises a machine learning algorithm, a rule-based algorithm, or both. The predicted demand schedule may comprise a predicted demand task location within the geographic area, a predicted demand period, or both. The predicted demand task location may comprise a GPS point, an address, a location of interest, or any combination thereof. The predicted demand period may comprise a peak demand time, a plurality of ranked peak demand times, a peak demand time period, a plurality of ranked demand time periods, or any combination thereof.

In some embodiments, the server application 1320 further comprises an interim repositioning module 1327. The interim repositioning module 1327 may assign an interim repositioning mode to each of the plurality of autonomous or semi-autonomous vehicles 1310. The interim repositioning module 1327 may assign an interim repositioning mode to each of the plurality of autonomous or semi-autonomous vehicles 1310 based at least on one or more of the predicted demand task location, the predicted demand period, the task destination, and the current vehicle status. In some embodiments, the interim repositioning mode comprises a depot mode corresponding to a depot location, a parking mode associated with one of a plurality of parking spot locations, and a hover mode associated with a set threshold hover distance from the task destination or the predicted demand task location. In some embodiments, the database 1312 further comprises the plurality of parking spot locations within the geographic area.

In some embodiments, the application 1320 further comprises a parking distribution module 1328. The parking distribution module 1328 may determine a selected parking spot location for one or more of the plurality of autonomous or semi-autonomous vehicles 1310. The parking distribution module 1328 may determine a selected parking spot location for one or more of the plurality of autonomous or semi-autonomous vehicles 1310 based on the parking mode, the plurality of the parking spot locations, and at least one of the task destination and the predicted demand task location. In some embodiments, the navigation module 1324 further applies the route calculation algorithm to determine a vehicle repositioning route from the task destination to the depot location, based on the depot mode. In some embodiments, the navigation module 1324 further applies the route calculation algorithm to determine a vehicle repositioning route from the task destination to the selected parking spot location, based on the parking mode. In some embodiments, the navigation module 1324 further applies the route calculation algorithm to determine a vehicle repositioning route from the task destination to a vehicle hover route based on the hover mode.

In some embodiments, the navigation module 1324 further applies the route calculation algorithm to determine a vehicle repositioning route from the task destination: to the depot location, based on the depot mode; to the selected parking spot location, based on the parking mode; or to a vehicle hover route based on the hover mode. In some embodiments, the navigation module 1324 further applies the route calculation algorithm to determine a vehicle repositioning route from the task destination to the depot location, based on the depot mode. In some embodiments, the navigation module 1324 further applies the route calculation algorithm to determine a vehicle repositioning route from the task destination to the selected parking spot location, based on the parking mode. In some embodiments, the navigation module 1324 further applies the route calculation algorithm to determine a vehicle repositioning route from the task destination to a vehicle hover route based on the hover mode.

In some embodiments, the vehicle hover route comprises at least a portion of one of the plurality of pathways within the set threshold hover distance from the task destination or the predicted demand task location. In some embodiments, the communication device 1314 further directs the autonomous or semi-autonomous propulsion system 1311 of the autonomous or semi-autonomous vehicle 1310 to remain at the depot location, the selected parking spot location, or within the vehicle 1310 hover route for the predicted demand period. In some embodiments, the communication device 1314 further directs the autonomous or semi-autonomous propulsion system 1311 of the autonomous or semi-autonomous vehicle 1310 to remain at the depot location for the predicted demand period. In some embodiments, the communication device 1314 further directs the autonomous or semi-autonomous propulsion system 1311 of the autonomous or semi-autonomous vehicle 1310 to remain at the selected parking spot location for the predicted demand period. In some embodiments, the communication device 1314 further directs the autonomous or semi-autonomous propulsion system 1311 of the autonomous or semi-autonomous vehicle 1310 to remain within the vehicle hover route for the predicted demand period.

In some embodiments, the autonomous or semi-autonomous vehicle 1310 further comprises a sensor configured to measure a sensed data. In some embodiments, the database 1312 further stores at least one of the current vehicle location, the current vehicle status, and the sensed data. In some embodiments, the pathway parameter is based at least on the sensed data. In some embodiments, at least one of the safety factor and the speed factor are based on the sensed data. In some embodiments, the sensed data enables crowd sourced safety factor and speed factor determination.

In some embodiments, the application 1320 further comprises a pathway parameter prediction module predicting a future pathway parameter based at least on the sensed data. In some embodiments, the route calculation algorithm further determines the vehicle 1310 task route based on the predicted road parameter. In some embodiments, the autonomous or semi-autonomous vehicle 1310 further comprises a sensor configured to measure a sensed data. The sensed data may correspond to a parking spot status of one or more of the plurality of parking spot locations within the geographic area. In some embodiments, the parking distribution module 1328 further determines the selected parking spot location based on the parking spot status.

In some embodiments, the server application further comprises a display module displaying at least one of the current vehicle location, the current vehicle status, the task destination, the pathway parameter, the task route, the selected parking spot location, and the predicted demand task location.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for autonomous or semi-autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the phrases "at least one," "one or more," and "and/or" are open-ended expressions that are both conjunctive and disjunctive in operation. For example, each of the expressions "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B, and C together.

As used herein, the terms "fleet" and "sub-fleet" are used to indicate a number of land vehicles, watercraft units, or aircraft units operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the terms "autonomous or semi-autonomous vehicle," "unit," "autonomous or semi-autonomous fleet," "autonomous or semi-autonomous vehicle fleet," "vehicle," and "all-terrain vehicle" are used to indicate a mobile machine capable of transporting cargo. The vehicle may include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the terms "user," "users," "operator," and "fleet operator" are used to indicate the entity that owns or is responsible for managing and operating the autonomous or semi-autonomous vehicle fleet. As used herein, the term "customer" is used to indicate the entity that requests the services provided the autonomous or semi-autonomous vehicle fleet.

As used herein, the terms "provider," "business," "vendor," and "third-party vendor" are used to indicate an entity that works in concert with the fleet owner or operator to utilize the services of the autonomous or semi-autonomous vehicle fleet to deliver the provider's product from and or return the provider's product to the provider's place of business or staging location.

As used herein, the terms "white label," "white label product," "white label services," and "white label provider" shall refer to a product or service produced by one company (the producer) that other companies (the marketers) rebrand to make it appear as if they had made it.

As used herein, the terms "maximum speed" and "maximum speed range" shall refer to maximum speeds of which the autonomous or semi-autonomous vehicle is capable of generating, and permitted, to operate within the tasked environment, such as on open roads, bike paths, and other environments where higher speeds are appropriate.

As used herein, the term "operating speed" shall refer to a full range of speeds within which the autonomous or semi-autonomous vehicle is capable of operating, (including a full stop, or zero speed), as determined by the on-board sensors and software which may monitor environmental conditions, the operating environment, etc. to determine an appropriate speed at any given time.

As used herein, the terms "inspection" and "monitoring," shall refer to, and include the use of, autonomous or semi-autonomous vehicles collecting data from the environment that may be used to monitor, inspect, or evaluate any number of elements of the environment.

As used herein, the term "environment" shall refer to the physical surroundings or conditions in which an autonomous or semi-autonomous vehicle operates, its functional habitat, geographic location, territory, domain, surroundings, environs, or conditions, including atmospheric conditions such as rain, humidity, solar index, wind conditions, barometric pressure, and the like.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees or 0.01 degrees of a given value or range. In certain embodiments, the term "about" or "approximately" means within 0.1 mph, 0.2 mph, 0.3 mph, 0.4 mph, 0.5 mph, 0.6 mph, 0.7 mph, 0.8 mph, 0.9 mph, 1.0 mph, 1.1 mph, 1.2 mph, 1.3 mph, 1.4 mph, 1.5 mph, 1.6 mph, 1.7 mph, 1.8 mph, 1.9 mph, 2.0 mph, 3.0 mph, 4.0 mph or 5.0 mph of a given value or range.

As used herein, the terms "server," "computer server," "central server," "mobile server," and "client server" indicate a computer or device on a network that manages the fleet resources, namely the autonomous or semi-autonomous vehicles.

As used herein, the term "controller" is used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the autonomous or semi-autonomous vehicle such as the securable compartments.

As used herein a "mesh network" is a network topology in which each node relays data for the network. All mesh nodes cooperate in the distribution of data in the network. It may be applied to both wired and wireless networks. Wireless mesh networks may be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs may take any form of network topology. Mesh networks may relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is reliable, as there is often more than one path between a source and a destination in the network. This concept may also apply to wired networks and to software interaction. A mesh network whose nodes are all connected to each other is a fully connected network.

As used herein, the term "module" is used to indicate a self-contained hardware component of the central server, which in turn comprises software modules. In software, a module is a part of a program. Programs are composed of one or more independently developed modules that are not combined until the program is linked. A single module may contain one or several routines, or sections of programs that perform a particular task. As used herein the fleet management module comprises software modules for managing various aspects and functions of the autonomous or semi-autonomous vehicle fleet.

As used herein, the terms "processor" and "digital processing device" are used to indicate a microprocessor or one or more central processing units (CPUs). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user or plurality of users. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In still some embodiments, the display is a combination of devices such as those disclosed herein.

EXAMPLES

Example 1—Platform for Distributing and Navigating

In one example, the platform for distributing and navigating an autonomous or semi-autonomous fleet throughout a plurality of pathways comprises the fleet comprising a plurality of autonomous or semi-autonomous vehicles and a server processor configured to provide a server application.

A communication module of the server application receives a current vehicle location, determined by a locational sensor on the vehicle, and a current vehicle status, measured by a condition sensor, from the communication device, wherein the current vehicle status comprises a vehicle power level, a vehicle stock, and vehicle hardware status.

The dispatch module then assigns one or more of the plurality of autonomous or semi-autonomous vehicles to a task destination associated with an order, based on the current vehicle location and the current vehicle status.

The navigation module then receives a pathway parameter comprising an autonomous driving safety factor and a speed factor from a database within the server application, wherein a plurality of pathways are stored in a map. The navigation module then applies a route calculation algorithm to determine a vehicle task route from the current vehicle location to the task destination based on the pathway parameter and the current vehicle status, wherein the vehicle task route comprises at least a portion of one of the plurality of pathways The communication device then directs the autonomous or semi-autonomous propulsion system of the autonomous or semi-autonomous vehicle based on the vehicle task route.

Example 2—Platform for Interim Depot Repositioning

In another example, once the autonomous or semi-autonomous vehicle traverses the vehicle task route, and fulfills the order at the task destination.

As the current vehicle status of one autonomous or semi-autonomous vehicle comprises a low battery indication, an interim repositioning module assigns an interim repositioning mode to the autonomous or semi-autonomous vehicle comprising a depot mode, wherein the depot mode corresponds to a depot location. The navigation module then applies the route calculation algorithm to determine a vehicle repositioning route from the task destination to the depot location, wherein the communication device then directs the autonomous or semi-autonomous propulsion system of the autonomous or semi-autonomous vehicle based on the vehicle repositioning route.

Example 3—Platform for Interim Hover Repositioning

In another example, once the autonomous or semi-autonomous vehicle traverses the vehicle task route, and fulfills the order at the task destination, the server application may employ a demand forecasting module to determine that high demand will occur at a within a set threshold hover distance of 2 miles from a predicted demand task location of 123 Main Street and at a predicted demand period of 1:00 pm to 2:00 pm, based on historical demand data associated with a geographic area.

As the current vehicle status of a third autonomous or semi-autonomous vehicle comprises a high battery and medium stock indication, the interim repositioning module assigns an interim repositioning mode to the autonomous or semi-autonomous vehicle comprising a hover mode associated with the set threshold hover distance from the predicted demand task location.

The navigation module then applies the route calculation algorithm to determine a vehicle hover route from the task destination within the set threshold hover distance from the predicted demand task location. The communication device then directs the autonomous or semi-autonomous propulsion system of the autonomous or semi-autonomous vehicle based on the vehicle hover route such that the vehicle arrives and/or is positioned within the set threshold of the predicted demand task location at the predicted demand period.

Example 4—Platform for Interim Parking Repositioning

In another example, once the autonomous or semi-autonomous vehicle traverses the vehicle task route and fulfills the order at the task destination, the server application may employ a demand forecasting module to determine that high demand will occur at a predicted demand task location of 444 Elm Street and at a predicted demand period of 5:00 pm, based on historical demand data associated with a geographic area.

As the current vehicle status of a third autonomous or semi-autonomous vehicle comprises a medium battery and a high stock indication, the interim repositioning module assigns an interim repositioning mode to the autonomous or semi-autonomous vehicle comprising a parking mode associated with the predicted demand task location.

A parking distribution module then determines a selected parking spot location from a plurality of parking spot locations within a database based on the predicted demand task location.

A sensor aboard the autonomous or semi-autonomous vehicle further then measures a sensed data, which is stored in the database. The sensed data and previously stored sensed data are used to predict and determine the pathway parameter of the roadway. The navigation module then applies a route calculation algorithm to determine a vehicle repositioning route from the task destination to the selected parking spot location based on the current and predicted pathway parameters. The communication device then directs the autonomous or semi-autonomous propulsion system of the autonomous or semi-autonomous vehicle based on the vehicle repositioning route.

A display module then displays at least one of the current vehicle location, the current vehicle status, the task destination, the pathway parameter, the task route, the selected parking spot location, and the predicted demand task location to a user or a fleet manager.

Example 5—Platform for Interim Parking Repositioning

In another example, an automatic fleet distribution module controls where all the vehicles should be at any point time. The vehicle drives to a depot, find a legal parking spot, loop around the block, be assigned to the next task/customer. A task request module receives a task request from an API, a web interface, a mobile interface, or any combination thereof with specific locations associated with the task. A dispatcher module dispatches a vehicle to a particular task which works with a fleet-wide navigation module to choose a vehicle that will likely get to the location fastest or within a scheduled time given the current statuses of all vehicles in the fleet.

An active-but-not-in-service vehicle distribution module decides what each vehicle should be doing when it's not servicing a customer. A demand forecasting module, which may be a rule-based, statistical, a machine learning, or both, forecasts a demand level at any point in time throughout the city. A Location optimization module receives a vehicle's current location, battery level, or other status types, and demand forecast, and determines what should each vehicle be doing among four possible tasks: remaining in the immediate local area (find a temporary parking spot or loop around the block), move to another neighborhood area, find a depot, or go to a particular location. A database of conditions of all vehicles in fleet stores the current statuses of all vehicles in the fleet including: locations, battery levels, current tasks, mechanical status/errors, current destinations, etc. Communication module between the server and the vehicles may occur for collaborative or direct implementation of tasks.

Example 6—Parking and Depot Module

In another example, a parking and depot module may be marked by the fleet distribution module or any other system as wanting to go to find parking or depot, the parking and depot finds the best parking spot or depot for the vehicle. A database of depots and parking spots lives on the server and is either manually or automatically created. The database of depots includes availability of charger and optional, a number of available spots. A closest parking/depot optimization module—this module takes in vehicle's current location and collaborates with the navigation module to find the best parking spot/depot that is fastest for the vehicle to get to that meets the needs of the vehicle (e.g., charger availability). A crowdsourced parking spot database may receive reports from each of the vehicles to form a live parking database comprising the parking availability throughout the city.

Example 7—Fleet-Wide Navigation Module

In another example, a fleet-wide navigation module receives a signal relating to where a vehicle is and where the vehicle needs to go. The fleet-wide navigation module determines where the vehicle should go and the best path there. An optimal navigation path calculation module using city map data, and a cost algorithm to balance between the fastest path and the safest path for AV. The cost algorithm may choose to weigh certain conditions as bad for AVs such as high-speed roads, unprotected turns/U-turns, live/historical density of pedestrians, live/historical density of cyclists, road smoothness, road slope grade, road visibility, etc. The fleet-wide navigation module then uses a combination of methodologies (e.g., simple weight between fastest and safest paths, or some threshold such as fastest path given X safety score, etc.) to determine the best path for an AV from point A to point B. The fleet-wide navigation module comprises a map database including speed limits, types of intersections and turns, number of lanes, cell reception. As a crowdsourced element, all vehicles in the fleet report back to the server live road conditions including amount/speed of traffic, temporary traffic pattern modifications including accidents and construction, the number of pedestrians and cyclists, road visibility, etc. Live/historical databases record this information "crowdsourced" from all vehicles in the fleet to help forecast the fastest and safest path.

What is claimed is:

1. A platform for distributing and navigating an autonomous or semi-autonomous fleet throughout a plurality of pathways, the platform comprising:
   a) the fleet comprising a plurality of autonomous or semi-autonomous vehicles wherein each autonomous or semi-autonomous vehicle comprises:
      (i) an autonomous or semi-autonomous propulsion system;
      (ii) a locational sensor configured to measure a current vehicle location of the vehicle;
      (iii) a condition sensor configured to measure a current vehicle status; and
      (iv) a communication device configured to transmit the current vehicle location and the current vehicle status; and
   b) a server processor configured to provide a server application comprising:
      (i) a database comprising a map of the plurality of pathways, wherein each pathway is associated with a pathway parameter comprising an autonomous driving safety factor and a speed factor;
      (ii) a demand database comprising a historical demand data associated with a geographic area, and wherein the geographic area comprises at least the task destination;
      (iii) a demand forecasting module applying a prediction algorithm to determine a predicted demand schedule for each of the autonomous or semi-autonomous vehicles based at least on the historical demand data, wherein the predicted demand schedule comprises a predicted demand task location within the geographic area and a predicted demand period;
(iv) a communication module receiving the current vehicle location and the current vehicle status from the communication device;
(v) a dispatch module assigning one or more of the plurality of autonomous or semi-autonomous vehicles to a task destination based at least on the current vehicle location and the current vehicle status;
(vi) a navigation module applying a route calculation algorithm to determine a vehicle task route from the current vehicle location to the task destination based at least on the pathway parameter and the current vehicle status, wherein the vehicle task route comprises at least a portion of one of the plurality of pathways; and
(vii) an interim repositioning module assigning an interim repositioning mode to each of the plurality of autonomous or semi-autonomous vehicles based at least on one or more of the predicted demand task location, the predicted demand period, the task destination, and the current vehicle status, the interim repositioning modes comprising:
  i. a depot mode corresponding to a depot location;
  ii. a parking mode associated with one of a plurality of parking spot locations; and
  iii. a hover mode associated with a set threshold hover distance from the task destination or the predicted demand task location,
wherein the communication device further directs the autonomous or semi-autonomous propulsion system of the autonomous or semi-autonomous vehicle based on the vehicle task route.

2. The platform of claim 1, wherein the database further comprises the plurality of parking spot locations within the geographic area.

3. The platform of claim 2, wherein the application further comprises a parking distribution module determining a selected parking spot location for one or more of the plurality of autonomous or semi-autonomous vehicles based on the parking mode, the plurality of the parking spot locations, and at least one of the task destination and the predicted demand task location.

4. The platform of claim 3, wherein the navigation module further applies the route calculation algorithm to determine a vehicle repositioning route from the task destination:
  a) to the depot location, based on the depot mode;
  b) to the selected parking spot location, based on the parking mode; or
  c) to a vehicle hover route based on the hover mode.

5. The platform of claim 4, wherein the vehicle hover route comprises at least a portion of one of the plurality of pathways within the set threshold hover distance from the task destination or the predicted demand task location.

6. The platform of claim 4, wherein the communication device further directs the autonomous or semi-autonomous propulsion system of the autonomous or semi-autonomous vehicle to remain at the depot location, the selected parking spot location, or within the vehicle hover route for the predicted demand period.

7. The platform of claim 1, wherein the route calculation algorithm comprises a machine learning algorithm, a rule-based algorithm, or both.

8. The platform of claim 1, wherein the prediction algorithm comprises a machine learning algorithm, a rule-based algorithm, or both.

9. The platform of claim 1, wherein the current vehicle status comprises a vehicle power level, a vehicle stock, a vehicle hardware status, or any combination thereof.

10. The platform of claim 1, wherein at least one of the speed factor and the autonomous driving safety factor comprises a speed limit, an average speed, an average speed, a time-dependent average speed, a number of intersections, a number of turns, a turn type, an accident indicator, a stopped vehicle indicator, a number of lanes, a number of lanes, a one-way street indicator, a cellular reception parameter, a road slope, a maximum road slope, an average road slope, an average pedestrian density, a maximum pedestrian density, a minimum pedestrian density, a time-dependent pedestrian density, an average cyclist density, an unprotected turn parameter, a road smoothness parameter, a road visibility parameter, or any combination thereof.

11. The platform of claim 1, wherein the autonomous or semi-autonomous vehicle further comprises a sensor configured to measure a sensed data.

12. The platform of claim 11, wherein the database further stores at least one of the current vehicle location, the current vehicle status, and the sensed data.

13. The platform of claim 12, wherein at least one of the safety factor and speed factor is based on the sensed data.

14. The platform of claim 11, wherein the sensed data enables crowd sourced safety factor and speed factor determination.

15. The platform of claim 14, wherein the application further comprises a pathway parameter prediction module predicting a future pathway parameter based at least on the sensed data.

16. The platform of claim 15, wherein the route calculation algorithm further determines the vehicle task route based on the predicted road parameter.

17. The platform of claim 1, wherein the autonomous or semi-autonomous vehicle further comprises a sensor configured to measure a sensed data, and wherein the sensed data corresponds to a parking spot status of one or more of the plurality of parking spot locations within the geographic area.

18. The platform of claim 17, wherein the parking distribution module further determines the selected parking spot location based on the parking spot status.

19. The platform of claim 2, wherein the server application further comprises a display module displaying at least one of the current vehicle location, the current vehicle status, the task destination, the pathway parameter, the task route, the selected parking spot location, and the predicted demand task location.

* * * * *